United States Patent
Takata et al.

(10) Patent No.: US 10,538,276 B2
(45) Date of Patent: Jan. 21, 2020

(54) STRADDLE-TYPE VEHICLE

(71) Applicant: YAMAHA HATSUDOKI KABUSHIKI KAISHA, Iwata-shi, Shizuoka (JP)

(72) Inventors: Kazunari Takata, Shizuoka (JP); Keijiro Ota, Shizuoka (JP); Chisei Asami, Shizuoka (JP); Koji Kobayashi, Shizuoka (JP); Seiji Sawai, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 151 days.

(21) Appl. No.: 15/670,076

(22) Filed: Aug. 7, 2017

(65) Prior Publication Data
US 2017/0334488 A1    Nov. 23, 2017

Related U.S. Application Data

(60) Continuation-in-part of application No. 14/946,943, filed on Nov. 20, 2015, now Pat. No. 10,046,830.
(Continued)

(51) Int. Cl.
| | | |
|---|---|---|
| *B62D 21/18* | (2006.01) | |
| *B62D 27/04* | (2006.01) | |

(Continued)

(52) U.S. Cl.
CPC ............ *B62D 27/04* (2013.01); *B62M 27/02* (2013.01); *B62D 24/04* (2013.01); *B62D 25/088* (2013.01);
(Continued)

(58) Field of Classification Search
CPC ...... B62D 21/15; B62D 21/183; B62D 27/04; B62D 25/088; B60G 2206/014; B60G 2206/605; F16F 9/22; F16F 13/005
(Continued)

(56) References Cited

U.S. PATENT DOCUMENTS

| | | | | |
|---|---|---|---|---|
| 3,211,491 A | * | 10/1965 | Browne | ............... B62D 25/082 |
| | | | | 267/292 |
| 5,076,387 A | * | 12/1991 | Oka | .................... B62K 5/01 |
| | | | | 180/215 |

(Continued)

FOREIGN PATENT DOCUMENTS

| | | | | |
|---|---|---|---|---|
| EP | 2371693 | * | 5/2011 | ............ B62K 11/02 |
| EP | 3409971 | * | 5/2018 | ............... B62K 5/00 |

OTHER PUBLICATIONS

Sawai, "Straddle-Type Vehicle", U.S. Appl. No. 14/946,943, filed Nov. 20, 2015.

*Primary Examiner* — Anne Marie M Boehler
(74) *Attorney, Agent, or Firm* — Keating and Bennett, LLP

(57) ABSTRACT

A straddle-type vehicle includes a vehicle body frame; a power unit supported by the vehicle body frame; a seat mounted at a position higher than the power unit; a handle bar mounted at a position more forward than the seat; a pair of front wheels spaced apart from each other in a vehicle width direction; a pair of suspensions spaced apart from each other in the vehicle width direction and connecting the pair of front wheels to the vehicle frame; and a vehicle body vibration control damper including end portions connected to a first attachment portion and a second attachment portion, respectively, mounted on the vehicle body frame so as to be spaced apart from each other in a vehicle front-back direction, and mounted so as to extend in the vehicle front-back direction with at least a portion thereof located between the pair of suspensions.

7 Claims, 34 Drawing Sheets

Related U.S. Application Data which is a division of application No. 14/215,096, filed on Mar. 17, 2014, now Pat. No. 9,688,353.

(60) Provisional application No. 61/873,440, filed on Sep. 4, 2013.

(51) Int. Cl.
*B62M 27/02* (2006.01)
*B62D 25/08* (2006.01)
*B62D 24/04* (2006.01)
*F16F 13/00* (2006.01)
*F16F 9/22* (2006.01)

(52) U.S. Cl.
CPC . *B62M 2027/026* (2013.01); *B62M 2027/028* (2013.01); *F16F 9/22* (2013.01); *F16F 13/005* (2013.01)

(58) Field of Classification Search
USPC ............. 180/908, 300; 280/124.108, 124.08; 296/203.1
See application file for complete search history.

(56) References Cited

U.S. PATENT DOCUMENTS

| | | | | |
|---|---|---|---|---|
| 5,575,352 A * | 11/1996 | Suzuki | ...................... | B60G 3/20 180/309 |
| 6,206,460 B1 * | 3/2001 | Seeliger | ................. | B62D 21/00 188/267 |
| 6,595,533 B2 * | 7/2003 | Sawai | .................. | B62D 25/082 280/124.108 |
| 6,702,058 B2 * | 3/2004 | Ishii | ........................ | B62K 5/01 180/311 |
| 7,735,909 B2 * | 6/2010 | Satou | ..................... | B62D 25/20 280/781 |
| 7,896,371 B2 * | 3/2011 | Matsuura | ................. | B60G 3/20 180/311 |
| 9,248,877 B1 * | 2/2016 | Sawai | ...................... | B62D 7/22 |
| 9,688,353 B2 * | 6/2017 | Sawai | ................... | B62M 27/02 |
| 10,046,830 B2 * | 8/2018 | Sawai | ................... | B62M 27/02 |
| 2004/0124604 A1 * | 7/2004 | Takano | ................ | B62K 25/283 280/283 |

* cited by examiner

STRADDLE-TYPE VEHICLE

BACKGROUND OF THE INVENTION

1. Field of the Invention

The present invention relates to a straddle-type vehicle.

2. Description of the Related Art

Japanese Patent No. 4627389 discloses a technique for mounting a vehicle body vibration control damper on a four-wheeled vehicle.

SUMMARY OF THE INVENTION

The inventors of the present application have studied how to mount a vehicle body vibration control damper on a straddle-type vehicle, namely, an ATV (All-Terrain Vehicle), that is a vehicle for traveling on rough roads. The structure of such a straddle-type vehicle, which will receive a large reaction force from the ground surface when travelling on a rough road, is different from that of a typical four-wheeled vehicle. This difference in structure of a vehicle body frame causes unique vibrations in a straddle-type vehicle. Unfortunately, the optimum arrangement of a vehicle body vibration control damper to prevent such vibrations has yet to be discovered or developed.

Preferred embodiments of the present invention provide a vehicle body vibration control damper that prevents vibrations in a vehicle body frame of a straddle-type vehicle.

According to a preferred embodiment of the present invention, a straddle-type vehicle includes a vehicle body frame; a power unit supported by the vehicle body frame; a steering system supported by the vehicle body frame; a transmission unit that transmits a driving force generated by the power unit to a ground surface, in which ground touching portions of the transmission unit spaced apart from each other in a vehicle width direction receive reaction forces mutually different in magnitude; a suspension that suspends the transmission unit so as to swing in an up-down direction around an axle extending in the vehicle width direction relative to the vehicle body frame as a center; and a vehicle body vibration control damper extending between a first portion and a second portion that are spaced apart from each other of the vehicle body frame, each of the first portion and the second portion being located on the vehicle body frame or a member fixed to the vehicle body frame, the vehicle body vibration control damper generating a damping force against variations that change a distance between the first portion and the second portion.

According to a preferred embodiment of the present invention, a straddle-type vehicle includes a vehicle body frame; a power unit supported by the vehicle body frame; a seat mounted at a position higher than the power unit; a handle bar mounted at a position more forward than the seat; a pair of front wheels spaced apart from each other in a vehicle width direction; a pair of suspensions spaced apart from each other in the vehicle width direction and suspending the pair of front wheels on the vehicle frame; and a vehicle body vibration control damper including end portions connected to a first attachment portion and a second attachment portion, respectively, provided on the vehicle body frame and spaced apart from each other in a vehicle front-back direction, the vehicle body vibration control damper extending in the vehicle front-back direction with at least a portion thereof located between the pair of suspensions.

According to a preferred embodiment of the present invention, a straddle-type vehicle includes a vehicle body frame; a power unit supported by the vehicle body frame; a seat mounted at a position higher than the power unit; a handle bar mounted at a position more forward than the seat; a pair of front wheels spaced apart from each other in a vehicle width direction; a pair of shock absorbers spaced apart from each other in the vehicle width direction and suspending the pair of front wheels on the vehicle frame; and a vehicle body vibration control damper including end portions connected to a first attachment portion and a second attachment portion, respectively, provided on the vehicle body frame and that are be spaced apart from each other in the vehicle width direction, the vehicle body vibration control damper extending in the vehicle width direction at a location between where the pair of shock absorbers are mounted and the handle bar in the front portion of the vehicle body frame.

According to a preferred embodiment of the present invention, a straddle-type vehicle includes a vehicle body frame; a power unit supported by the vehicle body frame; a seat mounted at a position higher than the power unit; a handle bar mounted at a position more forward than the seat; a pair of front wheels spaced apart from each other in a vehicle width direction; a pair of shock absorbers spaced apart from each other in the vehicle width direction and suspending the pair of front wheels on the vehicle frame; and a vehicle body vibration control damper including end portions connected to a first attachment portion and a second attachment portion, respectively, and extending in the vehicle width direction, the first attachment portion and the second attachment portion provided on the vehicle body frame so as to be spaced apart from each other in the vehicle width direction, wherein the first attachment portion and the second attachment portion are attached to a pair of attachment portions where the pair of shock absorbers are attached in the front portion of the vehicle body frame, together with the pair of shock absorbers.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred embodiments of the present invention will be described with reference to the drawings.

Figure 1:
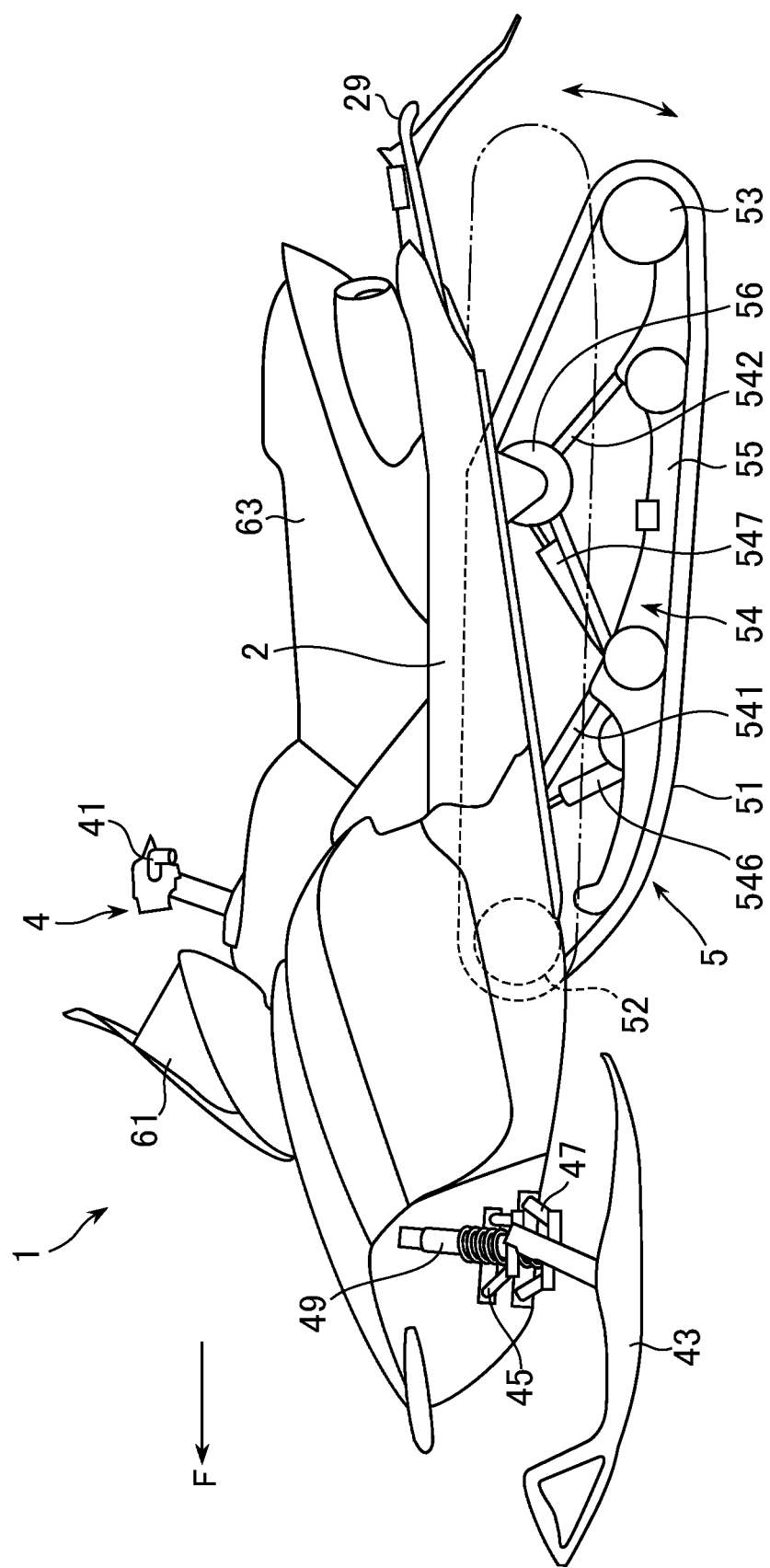
FIG. 1 is a side view of a snowmobile as an example of a straddle-type vehicle according to a preferred embodiment of the present invention.
Figure 2:
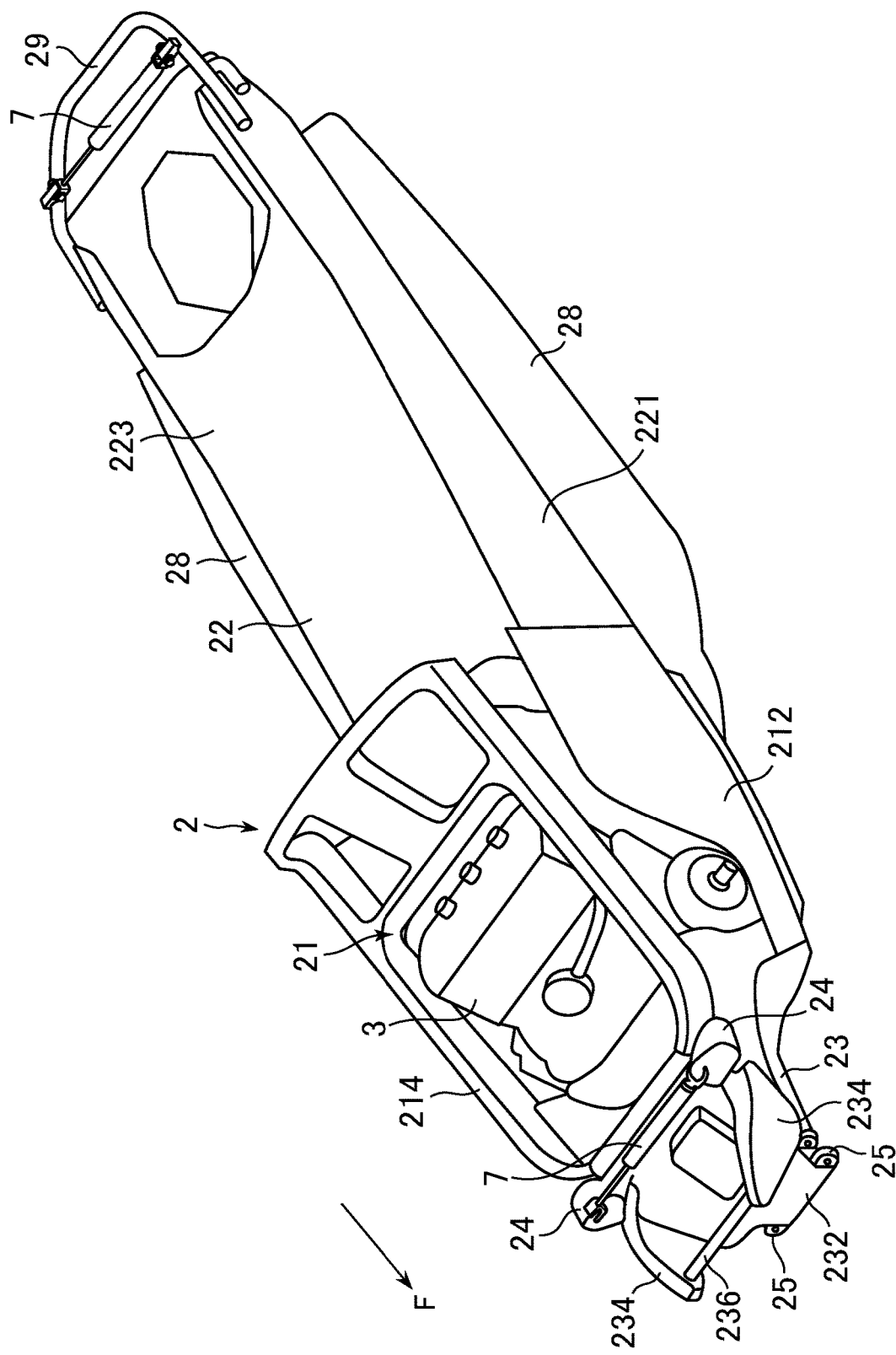
FIG. 2 is a perspective view of a vehicle body frame of the snowmobile.

Below, a snowmobile as an example of a straddle-type vehicle according to a preferred embodiment of the present invention will be described with respect to FIGS. 1-7. FIG. 1 is a side view of a snowmobile 1. FIG. 2 is a perspective view of a vehicle body frame 2 of the snowmobile 1. The arrow F in FIGS. 1 and 2 indicate the vehicle forward direction.

The snowmobile 1 includes a vehicle body frame 2 made of metal. An engine storage 21 is provided in the front portion of the vehicle body frame 2, where an engine 3, that is one example of a power unit, is stored (see FIG. 2). The engine 3 preferably is, for example, a water cooled four cycle parallel three cylinder engine.

A steering system 4 is supported in the front half portion of the vehicle body frame 2. The steering system 4 includes a handle bar 41 for operation by a driver and a pair of left and right skis 43 of which direction is changed in connection with rotation of the handle bar 41. The skis 43 are supported so as to move up and down by upper arms 45, lower arms 47, and shock absorbers 49. That is, so-called double wishbone suspensions are provided for the skis 43. A windshield 61 is mounted ahead of the handle bar 41, and a seat 15 for a driver to straddle is mounted behind the handle bar 41.

In the rear half portion of the vehicle body frame 2, a transmission unit 5 that transmits a driving force generated by the engine 3 to the ground surface is supported. The transmission unit 5 includes a track belt 51 that is rotated by a driving force from the engine 3. Specifically, inside the track belt 51, a drive wheel 52, a following wheel 53, a slider rail 55, and a following wheel 56 are mounted at the front end portion, at the rear end portion, between the drive wheel 52 and the following wheel 53, and above the slider rail 55, respectively. Of these, the drive wheel 52 and the following wheel 56 are supported by the vehicle body frame 2, while the following wheel 53 is supported by the rear end portion of the slider rail 55.

Between the vehicle body frame 2 and the slider rail 55, a plurality of torque arms 541, 542 and a plurality of shock absorbers 546, 547 are mounted, thus constituting a suspension 54 that supports the transmission unit 5 so as to swing in the up-down direction. In the suspension 54, a four-node link is implemented having nodes defined by respective upper and lower end portions of the torque arms 541, 542. That is, the torque arms 541, 542 are a part of the links included in the four-node link.

As shown in FIG. 2, the vehicle body frame 2 includes the engine storage 21, a belt storage 22 located behind the engine storage 21, and a ski support portion 23 located ahead of the engine storage 21. The engine storage 21 includes a pair of left and right lateral panel portions 212 and a top frame portion 214.

The belt storage 22 includes a pair of left and right lateral panel portions 221 and a top panel portion 223, and a configuration defined by a succession of concave cross sections extending in the front-back direction that open downward. A portion of the transmission unit 5 is provided in a space to the left and below the belt storage 22. The drive wheel 52 and the following wheel 56 of the transmission unit 5 are rotatably supported between the pair of left and right lateral panel portions 221. Foot rest portions 28 are integrally mounted at the lower end portion of the belt storage 22 so as to extend outward in the vehicle width direction. Further, a U-shaped grip bar 29 is fixed to the rear end portion of the belt storage 22. The grip bar 29 may be fixed to the rear end portion of the belt storage 22 by welding or by a fastener, such as a bolt or the like.

The ski support portion 23 includes a plurality of attachment portions 24, 25 where the upper arms 45, the lower arms 47, and the shock absorbers 49 shown in FIG. 1 are attached. Of these, the pair of left and right attachment portions 24 provided at the upper end portion of the ski support portion 23 projects outward in the vehicle width direction, and the upper end portions of the shock absorbers 49 are attached to these attachment portions 24. Further, the ski support portion 23 is directed upward and forward, and includes a front wall portion 232, a pair of left and right projecting portions 234 projecting forward from the respective left and right sides of the front wall portion 232, and a bridge portion 236 extending between the pair of left and right projecting portions 234.

Figure 3:
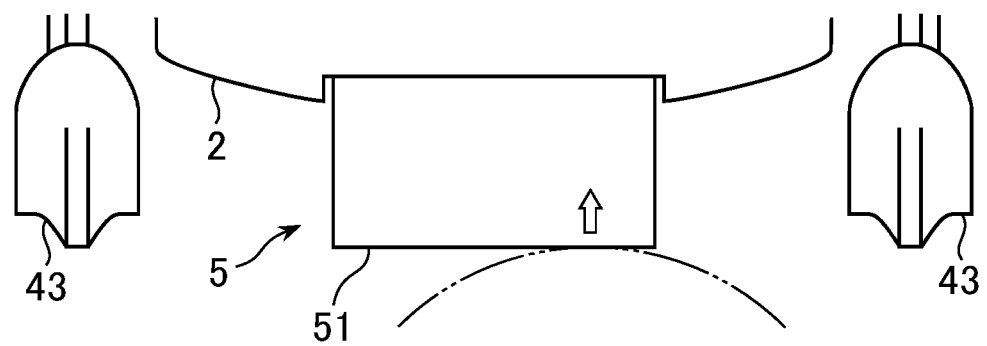
FIG. 3 is a front view showing an enlarged ground touching portion of the snowmobile.

As shown in FIG. 3, in the snowmobile 1 in the present preferred embodiment, when the track belt 51 of the transmission unit 5 has a predetermined dimension in the vehicle width direction, ground touching portions of the track belt 51 which are spaced apart from each other in the vehicle width direction receive reaction forces from the ground surface that are mutually different in magnitude. When the track belt 51 receives such reaction forces, a moment that pushes up one side of an axle extending in the vehicle width direction is transmitted from the transmission unit 5 to the vehicle body frame 2, which causes unique vibrations in the vehicle body frame 2.

In view of the above, in order to damp the unique vibrations in the vehicle body frame 2, the snowmobile 1 of the present preferred embodiment includes a plurality of vehicle body vibration control dampers 7. Each of the vehicle body vibration control dampers 7 is mounted to extend between first and second portions that are spaced apart from each other of the vehicle body frame and a member fixed to the vehicle body frame 2, and to generate a damping force against vibrations that change the distance between the first portion and the second portion.

Figure 4:
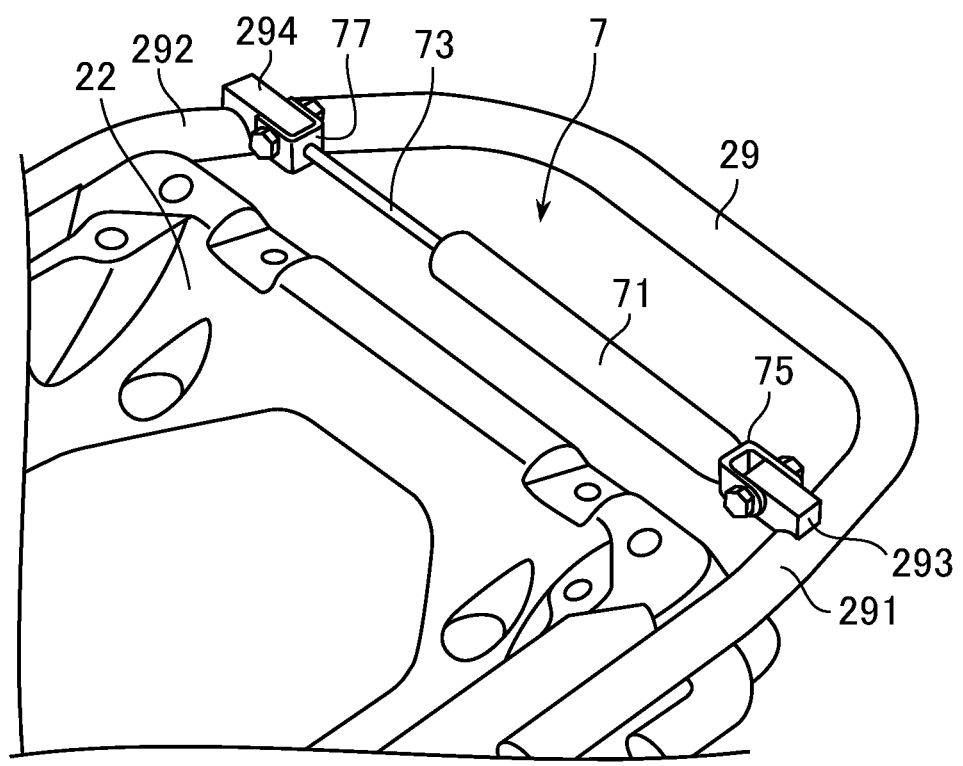
FIG. 4 shows enlarged major elements shown in FIG. 2.
Figure 5:
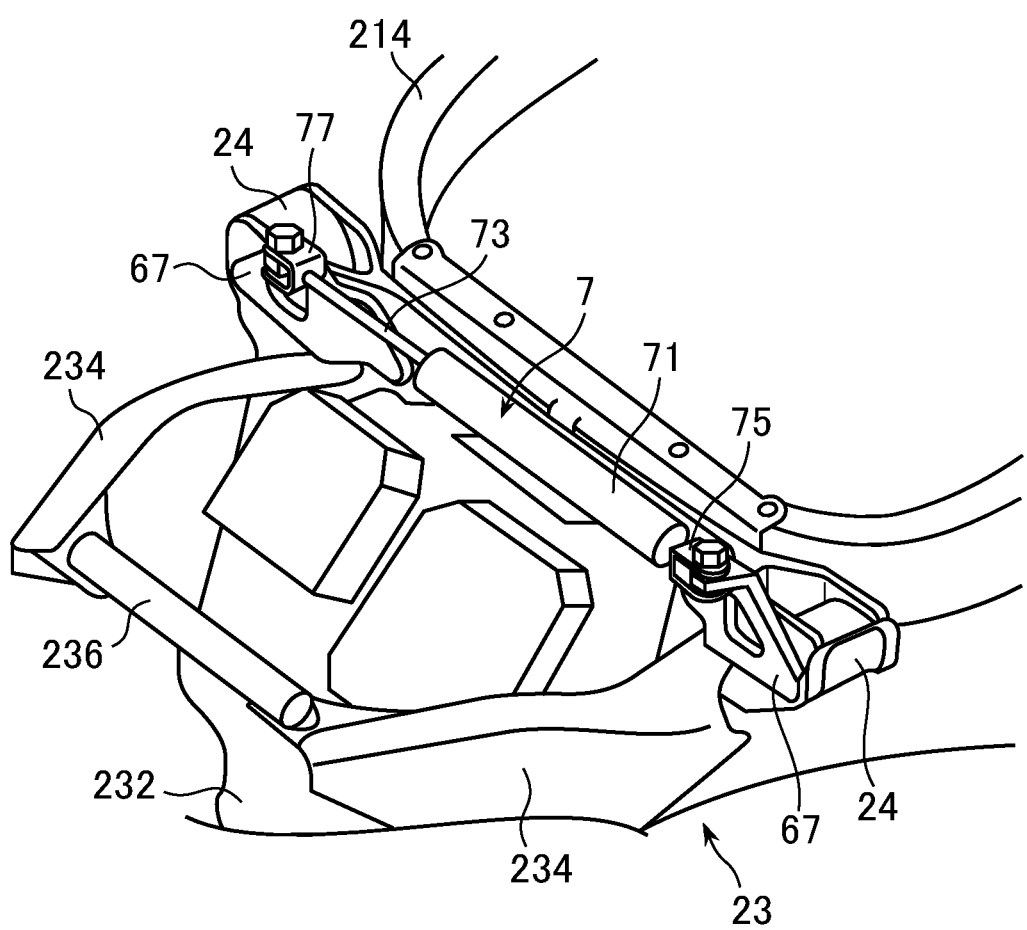
FIG. 5 shows enlarged major elements shown in FIG. 2.

Specifically, one of the vehicle body vibration control dampers 7 is mounted to extend between portions of a member fixed to the vehicle body frame 2, for example, portions of the grip bar 29 fixed to the rear end portion of the belt storage 22 of the vehicle body frame 2 (see FIG. 4), and another one of the vehicle body vibration control dampers 7 is mounted to extend between the pair of left and right attachment portions 24 provided on the ski support portion 23 of the vehicle body frame 2 (see FIG. 5).

Each vehicle body vibration control damper 7 is, for example, a high pressure sealed oil damper. Each vehicle body vibration control damper 7 includes a cylinder 71 and a piston rod 73 extending from the cylinder 71 and movable in the axial direction. In the cylinder 71, for example, oil, high pressure gas, and a spring are sealed, and when a piston (not shown) provided at the tip end of the piston rod 73 moves slightly in the axial direction inside the cylinder 71, a damping force in the opposite direction is generated. Further, attachment pieces 75, 77 are provided for the cylinder 71 and the piston rod 73, respectively.

As shown in FIG. 4, the vehicle body vibration control damper 7 extends between a left portion 291 and a right portion 292 of the grip bar 29 that are spaced apart from each other in the vehicle width direction. Specifically, one of the attachment pieces 75 of the vehicle body vibration control damper 7 is fastened by a bolt or the like to an attachment piece 293 provided on the left portion 291 of the grip bar 29. Further, the other attachment piece 77 of the vehicle body vibration control damper 7 is fastened by a bolt or the like to the attachment piece 294 provided on the right portion 292 of the grip bar 29. The vehicle body vibration control damper 7 generates a damping force against vibrations that change the distance between the left portion 291 and the right portion 292 of the grip bar 29.

When ground touching portions of the track belt 51 of the transmission unit 5 that are spaced apart from each other in the vehicle width direction receive reaction forces mutually different in magnitude from the ground surface and a moment that pushes up one side of the axle extending in the vehicle width direction is transmitted from the transmission unit 5 to the vehicle body frame 2, unique vibrations are caused in the vicinity of the rear end portion, which is a free end portion, of the vehicle body frame 2. According to the present preferred embodiment, since the vehicle body vibration control damper 7 extends between portions of the grip bar 29 fixed to the rear end portion of the belt storage 22 of the vehicle body frame 2, it is possible to damp the unique vibrations caused in the vicinity of the rear end portion of the vehicle body frame 2.

As shown in FIG. 5, the vehicle body vibration control damper 7 is mounted to extend between the pair of left and right attachment portions 24 spaced apart from each other in the vehicle width direction and provided on the ski support portion 23 of the vehicle body frame 2. Specifically, one attachment piece 75 of the vehicle body vibration control damper 7 is fastened by a bolt or the like to a bracket 67 fixed to the left attachment portion 24. Further, the other attachment piece 77 of the vehicle body vibration control damper 7 is fastened by a bolt or the like to a bracket 67 fixed to the right attachment portion 24. The vehicle body vibration control damper 7 generates a damping force against vibrations that change the distance between the pair of left and right attachment portions 24.

When the ground touching portions of the track belt 51 of the transmission unit 5 that are spaced apart from each other in the vehicle width direction receive reaction forces mutually different in magnitude from the ground surface and a moment that pushes up one side of the axle extending in the vehicle width direction is transmitted from the transmission unit 5 to the vehicle body frame 2, unique vibrations in the ski support portion 23 are provided to the front end portion of the vehicle body frame 2. Since vibrations received by the skis 43 are additionally applied to the ski support portion 23, vibrations in the ski support portion 23 can be likely caused as well. According to the present preferred embodiment, since the vehicle body vibration control damper 7 is mounted to extend between the pair of left and right attachment portions 24 provided on the ski support portion 23 of the vehicle body frame 2, it is possible to damp the unique vibrations in the ski support portion 23.

Although an example has been described in the above in which the vehicle body vibration control dampers 7 are mounted to extend between first and second portions that are spaced apart from each other in the vehicle width direction, this is not limiting, and the vehicle body vibration control damper 7 may extend between first and second portions that are spaced apart from each other in the vehicle front-back direction, or between first and second portions that are spaced apart from each other in the vehicle width direction and also in the vehicle front-back direction.

Figure 6:
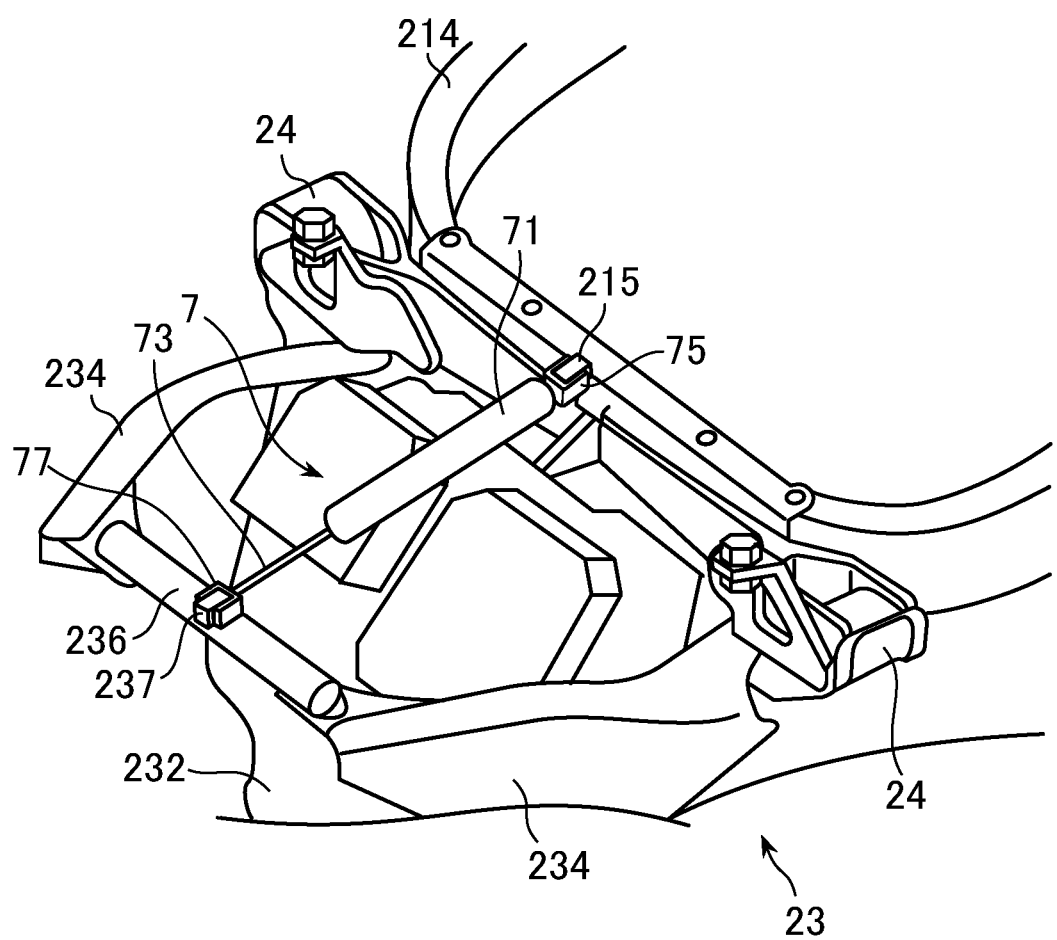
FIG. 6 shows a modified example of an arrangement of a vehicle body vibration control damper.

In the modified example shown in FIG. 6, the vehicle body vibration control damper 7 is mounted to extend in the vehicle front-back direction between the front end portion of the top frame portion 214 provided at the engine storage 21 of the vehicle body frame 2 and the bridge portion 236 provided at the ski support portion 23. Specifically, one of the attachment pieces 75 of the vehicle body vibration control damper 7 is fastened by a bolt or the like to the attachment piece 215 provided at the front end portion of the top frame portion 214. Further, the other attachment piece 77 of the vehicle body vibration control damper 7 is fastened by a bolt or the like to the attachment piece 237 provided at the bridge portion 236. The vehicle body vibration control damper 7 generates a damping force against vibrations that change the distance between the front end portion of the top frame portion 214 and the bridge portion 236.

Figure 7:
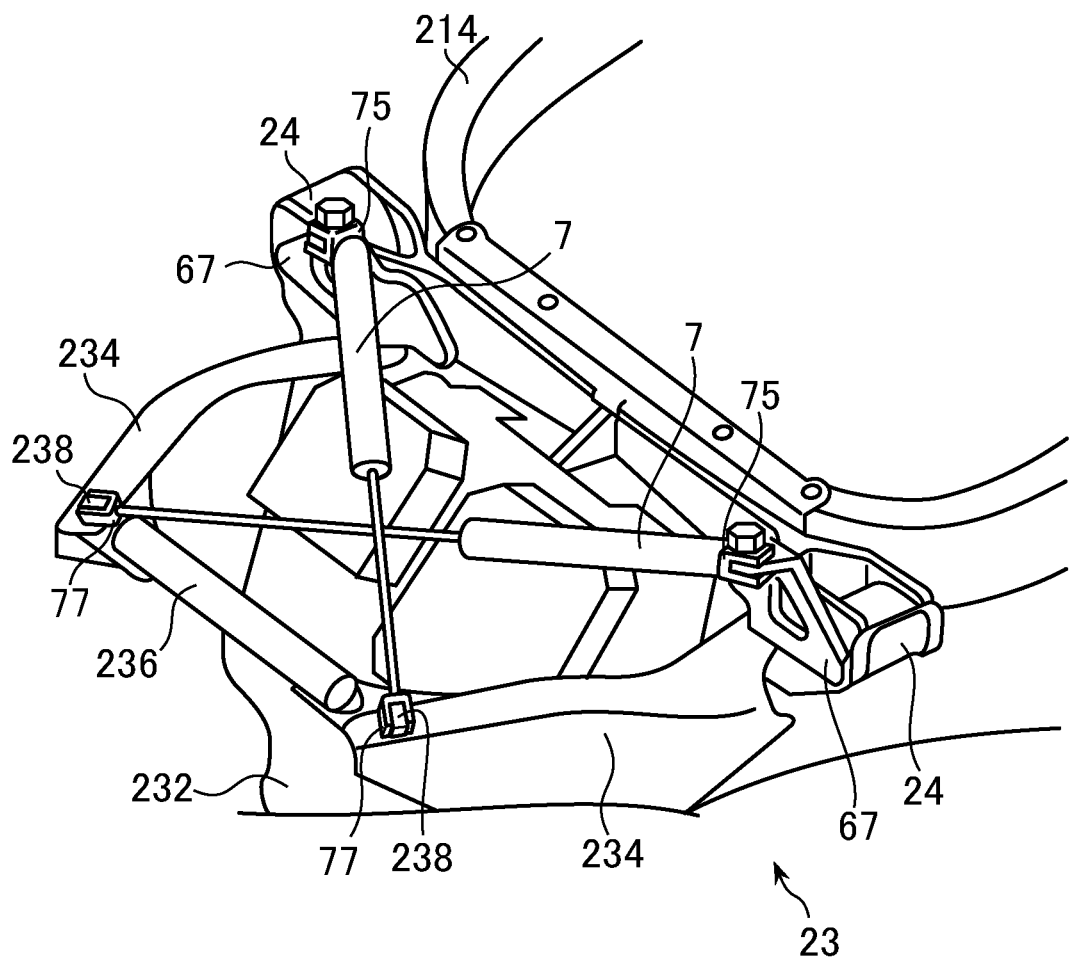
FIG. 7 shows a modified example of an arrangement of a vehicle body vibration control damper.

In the modified example shown in FIG. 7, two vehicle body vibration control dampers 7 are mounted intersecting with each other between the attachment portions 24 and the tip end portions of the projecting portions 234 of the ski support portion 23 that are spaced apart from each other in the vehicle width direction and also spaced apart from each other in the vehicle front-back direction. Specifically, one attachment piece 75 of the vehicle body vibration control damper 7 is fastened by a bolt or the like to the brackets 67 fixed to the attachment portions 24. Further, the other attachment piece 77 of the vehicle body vibration control damper 7 is fastened by a bolt or the like to the attachment pieces 238 provided at the tip end portion of the projected portions 234. The vehicle body vibration control damper 7 generates a damping force against vibrations that change the distance between the attachment portions 24 and the tip end portions of the projecting portions 234.

Figure 8:
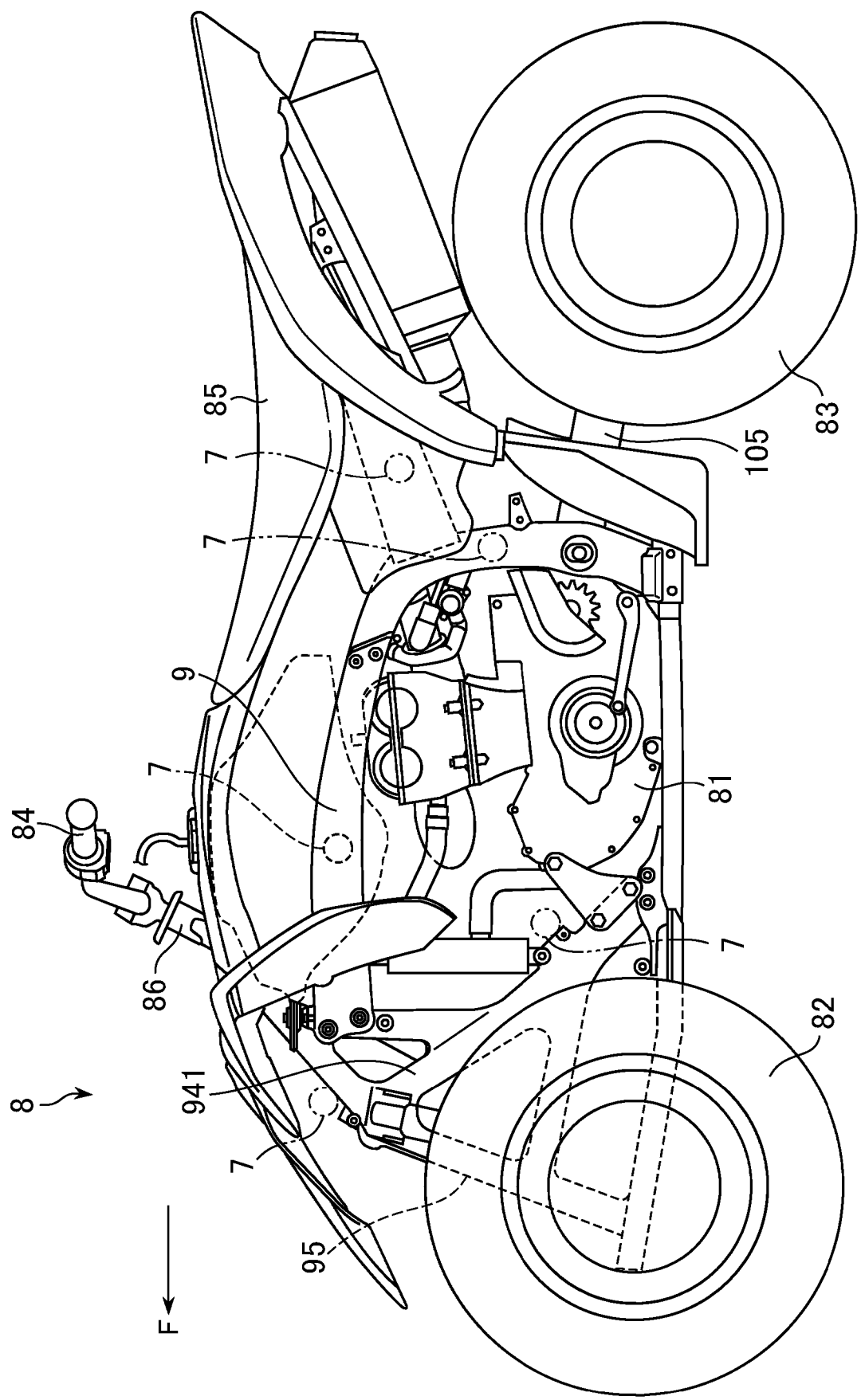
FIG. 8 is a side view of an ATV as an example of a straddle-type vehicle according to a preferred embodiment of the present invention.
Figure 9:
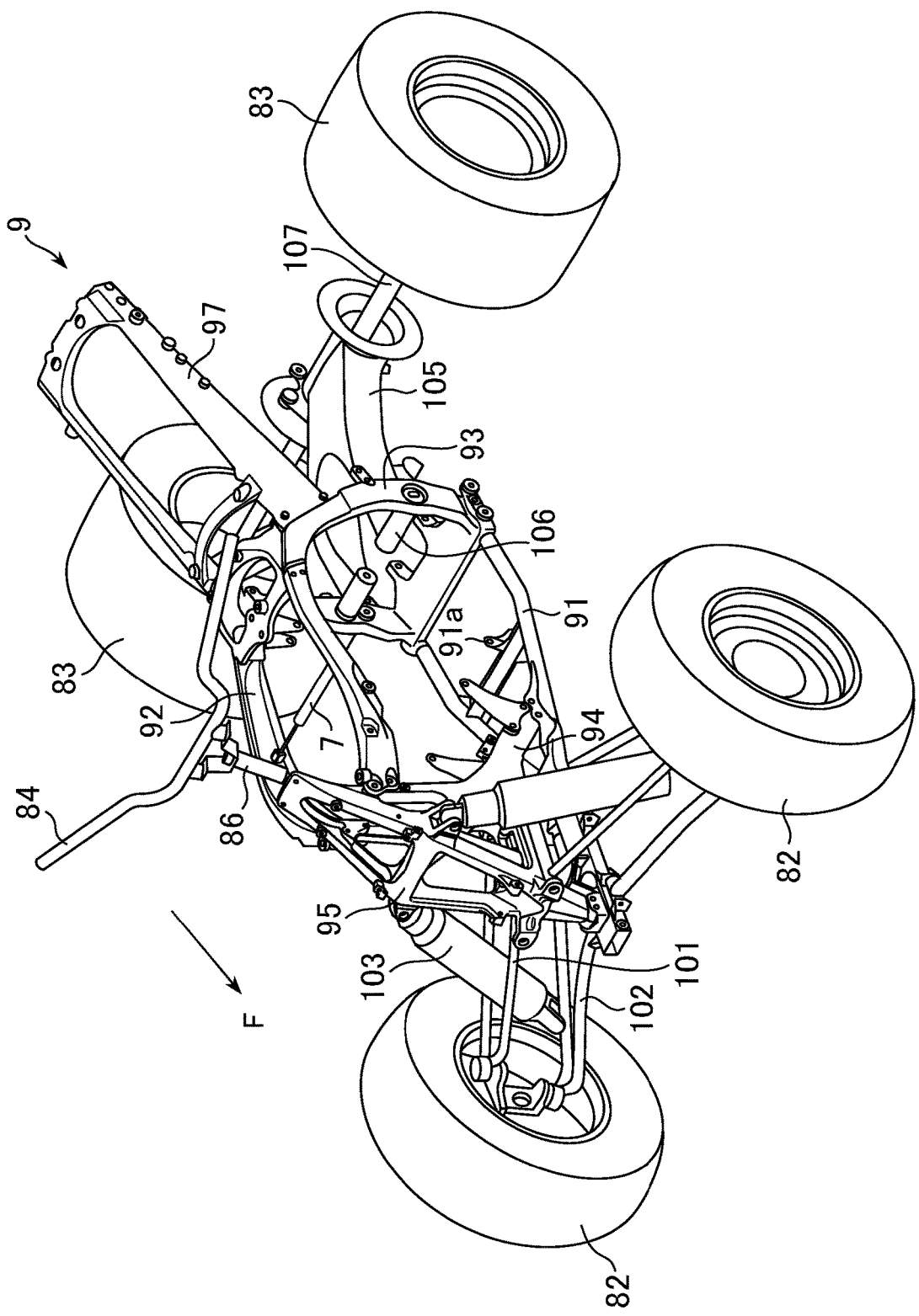
FIG. 9 is a perspective view of a vehicle body frame of the ATV.
Figure 10:
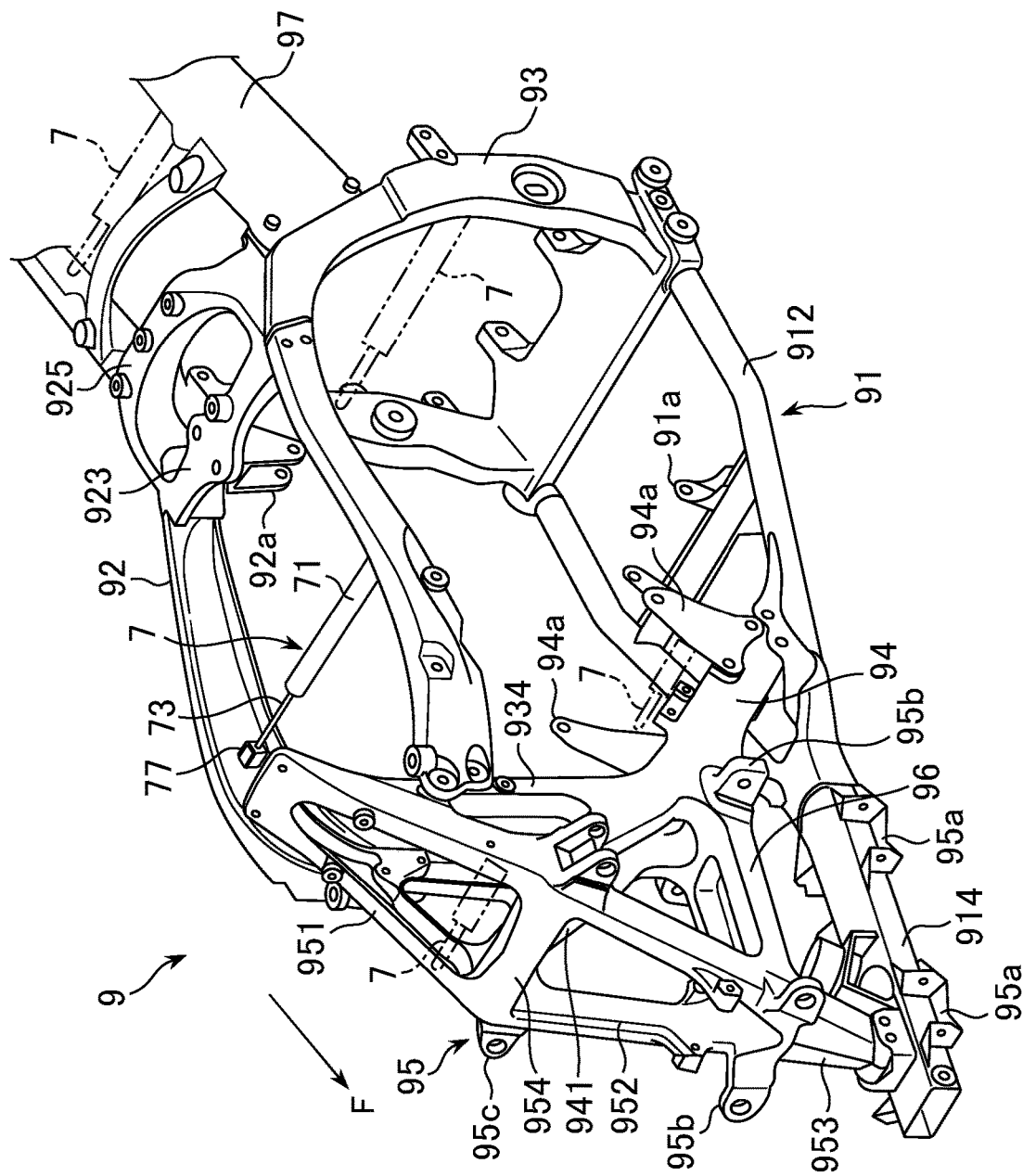
FIG. 10 is a side view of the vehicle body frame of the ATV.

Below, an ATV (All-Terrain Vehicle) as another example of the straddle-type vehicle according to a preferred embodiment of the present invention will be described. FIG. 8 is a side view of an ATV 8. FIG. 9 is a perspective view of a vehicle body frame 9 of the ATV 8. FIG. 10 is a side view of the vehicle body frame 9 of the ATV 8. The arrows F in FIGS. 8 to 10 indicate the vehicle forward direction.

The ATV 8 includes the vehicle body frame 9 made of metal, and an engine 81 mounted at the middle of the vehicle body frame 9 in the front-back direction. The engine 81 preferably is, for example, a water cooled single cylinder engine. A pair of front wheels 82 spaced apart from each other in the left-right direction is mounted at positions more forward than the engine 81. A pair of rear wheels 83 spaced apart from each other in the left-right direction is mounted at positions more rearward than the engine 81. In the present preferred embodiment, the pair of rear wheels 83 is drive wheels and functions as a portion of a transmission unit that transmits a driving force generated by the engine 81 to the ground surface.

A handle bar 84 for operation by a driver is mounted on the upper front side of the vehicle body frame 9A, and a seat 85 for a driver to straddle is mounted on the upper rear side of the vehicle body frame 9. The handle bar 84 is provided at the upper end portion of the steering shaft 86 extending in the up-down direction, and rotation of the handle bar 84 is transmitted to the front wheels 82.

The front wheels 82 are mounted on the respective left and right sides in the front portion of the vehicle body frame 9. The front wheels 82 are supported so as to move up and down by upper arms 101, lower arms 102, and shock absorbers 103. That is, the front wheels 82 are provided with so-called double wishbone suspensions.

A rear arm 105 is mounted behind the engine and extends mainly in the front-back direction. A driving force of the engine 81 is transmitted to the rear wheels 83 via a chain (not shown) or the like. A head pipe 106, namely the front end portion of the rear arm 105, is connected to the vehicle body frame 9 via a pivot axle (not shown) extending in the vehicle width direction, and the rear end portion of the rear arm 105 rotatably supports the axle 107 provided between the pair of rear wheels 83. The rear arm 105 supports the rear wheels 83 so as to move up and down with the pivot axle as a center.

In the ATV 8 of the present preferred embodiment, since no differential gear is mounted between the pair of rear wheels 83, the pair of rear wheels 83 always rotates at the same speed.

As shown in FIGS. 9 and 10, the vehicle body frame 9 includes a lower frame portion 91 extending in the front-back direction below the engine 81, upper frame portions 92 extending in the front-back direction above the engine 81, rear frame portions 93 extending in the up-down direction behind the engine 81, and a front frame portion 95 extending in the up-down direction ahead of the engine 81. The vehicle body frame 9 includes seat rail portions 97 extending rearward from upper portions of the rear frame portions 93. Further, the vehicle body frame 9 includes pillar portions 94 and beam portions 96 located between the front frame portion 95 and the engine 81.

The lower frame portion 91 includes a pair of base portions 912 spaced apart from each other in the left-right direction and extending in the front-back direction below the engine 81, and a single front portion 914 located more forward than the base portions 912 and extending in the front-back direction at the center in the left-right direction. That is, the lower frame portion 91 preferably has a Y-shape or a substantially Y-shape. The base portions 912 include brackets 91a projecting upward, and the engine 3 is connected to the brackets 91a. The front portion 914 includes two brackets 95a spaced apart from each other in the front-back direction and provided on each lateral surface of the front portion 914, and the lower arms 102 are connected to the brackets 95a.

The upper frame portions 92, the rear frame portions 93, and the seat rail portions 97 are each defined by a pair of portions spaced apart from each other in the left-right direction. Two crossbars 923, 925 are provided at the upper end portion of the rear frame portions 93 and extend in the left-right direction. Of these, the front crossbar 923 includes a bracket 92a projecting downward, and the engine 81 is connected to the bracket 92a. The head pipe 106 of the rear arm 105 is connected to the inner side of the pair of rear frame portions 93 in the vehicle width direction.

The rear end portion of the lower frame portion 91 is connected to the lower end portions of the rear frame portions 93, and the rear end portions of the upper frame portions 92 are connected to the upper end portions of the rear frame portions 93. The front end portions of the seat rail portion 97 are connected to the upper end portions of the rear frame portions 93.

The front frame portion 95 includes upper pillar portions 951, middle pillar portions 952, and a lower pillar portion 953, in which the upper pillar portions 951 preferably have a reversed V-shape expanding in the left-right direction as it extends downward, the middle pillar portions 952, located below the upper pillar portion 951, preferably have a V-shape becoming narrower in the left-right direction as it extends downward, and the lower pillar portion 953, located below the middle pillar portions 952, extends in the up-down direction. The front frame portion 95 includes a crossbar 954 extending in the left-right direction between the connection portions of the upper pillar portions 951 and the middle pillar portions 952. Brackets 95c are provided on lateral surfaces of the connection portions of the upper pillar portions 951 and the middle pillar portions 952, and the shock absorbers 103 are connected to the brackets 95c.

The upper end portion of the front frame portion 95 is connected to the front end portions of the upper frame portions 92, and the lower end portion of the front frame portion 95 is connected to the front end portion of the front portion 914 of the lower frame portion 91.

The pillar portions 94 extend in the upward and forward direction from the connection portions of the base portions 912 and the front portion 914 of the lower frame portion 91. The upper end portions of the pillar portions 94 are branched into two portions in the front-back direction, namely, front branch portions 941 and rear branch portions 934, in which the front branch portions 941 are connected to the connection portions of the upper pillar portions 951 and the middle pillar portions 952 of the front frame portion 95, and the rear branch portions 943 are connected to the front end portions of the upper frame portions 92. Brackets 94a are connected to the lower end portions of the pillar portions 94, and the engine 81 is connected to the brackets 94a.

The beam portions 96 extend in the front-back direction between the front frame portion 95 and the pillar portions 94. The front end portions of the beam portions 96 are connected to the connection portions of the middle pillar portions 952 and the lower pillar portion 953 of the front frame portion 95, while the rear end portions of the beam portions 96 are connected to midway portions of the pillar portions 94. Brackets 95b are provided on the lateral surfaces of the connection portions of the middle pillar portions 952 and the lower pillar portion 953 of the front frame portion 95, and the connection portions of the beam portions 96 and the pillar portions 94, and the upper arms 101 are connected to the brackets 95b.

In the ATV 8 of the present preferred embodiment, the pair of rear wheels 83 spaced apart from each other in the vehicle width direction receive reaction forces mutually different in magnitude from the ground surface. When the pair of rear wheels 83 receives such reaction forces, a moment that pushes up one side of the pivot axle extending in the vehicle width direction is transmitted from the rear arm 105 to the vehicle body frame 9, which causes unique vibrations in the vehicle body frame 9.

Further, in the ATV 8 in the present preferred embodiment, when an outer wheel is transmitting a driving force while gripping a road surface during the turn, an inner wheel is slipping since the pair of rear wheels 83 always rotates at the same rotation speed. Since resistance on a road surface is not always constant, it is expected that the inner wheel momentarily repeats gripping and slipping on the road surface, rather than continuing stable slipping. In this situation, a moment that momentarily repeats pushing the inner side of the axle in the running direction and releasing such pushing is transmitted from the rear arm 105 to the vehicle body frame 9 while receiving a moment that pushes the outer side of the axle extending in the vehicle width direction in the running direction, which causes unique vibrations in the vehicle body frame 9.

In the above, the ATV 8 in the present preferred embodiment as well includes a vehicle body vibration control damper 7 to damp the unique vibrations in the vehicle body frame 9, similar to the snowmobile 1 in the above described preferred embodiments.

Specifically, the vehicle body vibration control damper 7 is mounted to extend between the pair of left and right upper frame portions 92 of the vehicle body frame 9 (see FIGS. 9 and 10). The vehicle body vibration control damper 7 generates a damping force against vibrations that change the distance between the pair of left and right upper frame portions 92. With the above, it is possible to damp the unique vibrations in the vehicle body frame 9.

The vehicle body vibration control damper 7 is not limited to the upper frame portions 92, and the vehicle body vibration control damper 7 may be mounted at a different position. For example, as indicated by the long dashed double-short dashed line in FIGS. 8 and 10, the vehicle body vibration control dampers 7 may be mounted to extend between the pair of left and right rear frame portions 93, between the pair of left and right seat rail portions 97, between the upper pillar portions 951 in a reversed V-shape of the front frame portion 95, or between branched lower end portions of the pillar portions 94 in the left-right direction.

In the snowmobile 1 and the ATV 8 in the above described preferred embodiments, a moment that pushes up one side of an axle extending in the vehicle width direction is transmitted from the transmission unit to the vehicle body frame as ground touching portions of the transmission unit spaced apart from each other in the vehicle width direction may receive reaction forces mutually different in magnitude from the ground surface, as a result of which unique vibrations are likely to be caused in the vehicle body frame. Meanwhile, a motorcycle does not have such a moment since the wheels are relatively thin and the vehicle body is inclined when turning.

Below, other preferred embodiments of an ATV (a straddle-type four-wheeled vehicle including a handle bar) will be described. In the following description, components the same as those described in other preferred embodiments will be given the same reference numerals, and may not be described in detail again.

In this specification, a forward direction, a rearward direction, an upward direction, a downward direction, a leftward direction, and a rightward direction refer to a forward direction, a rearward direction, an upward direction, a downward direction, a leftward direction, and a rightward direction, respectively, viewed from a driver straddling the seat 85 with his/her face directed toward a handle bar 84.

Figure 11:
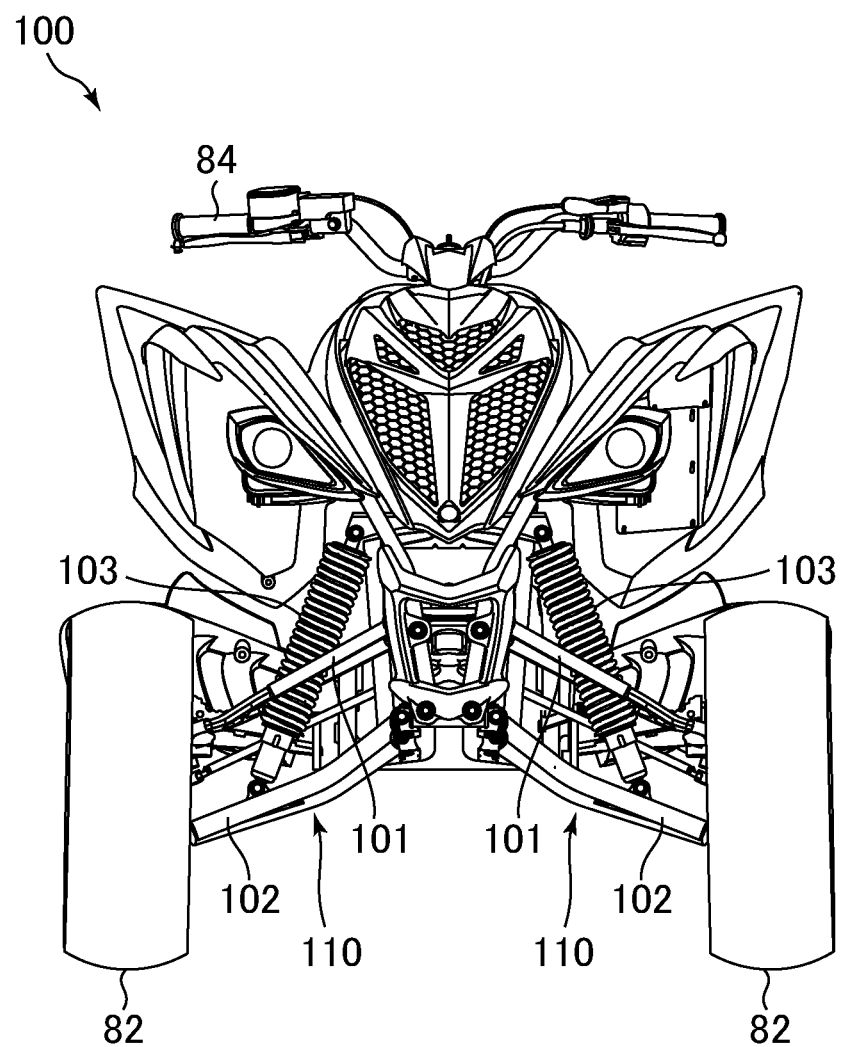
FIG. 11 is a front view of an ATV according to a preferred embodiment of the present invention.
Figure 12:
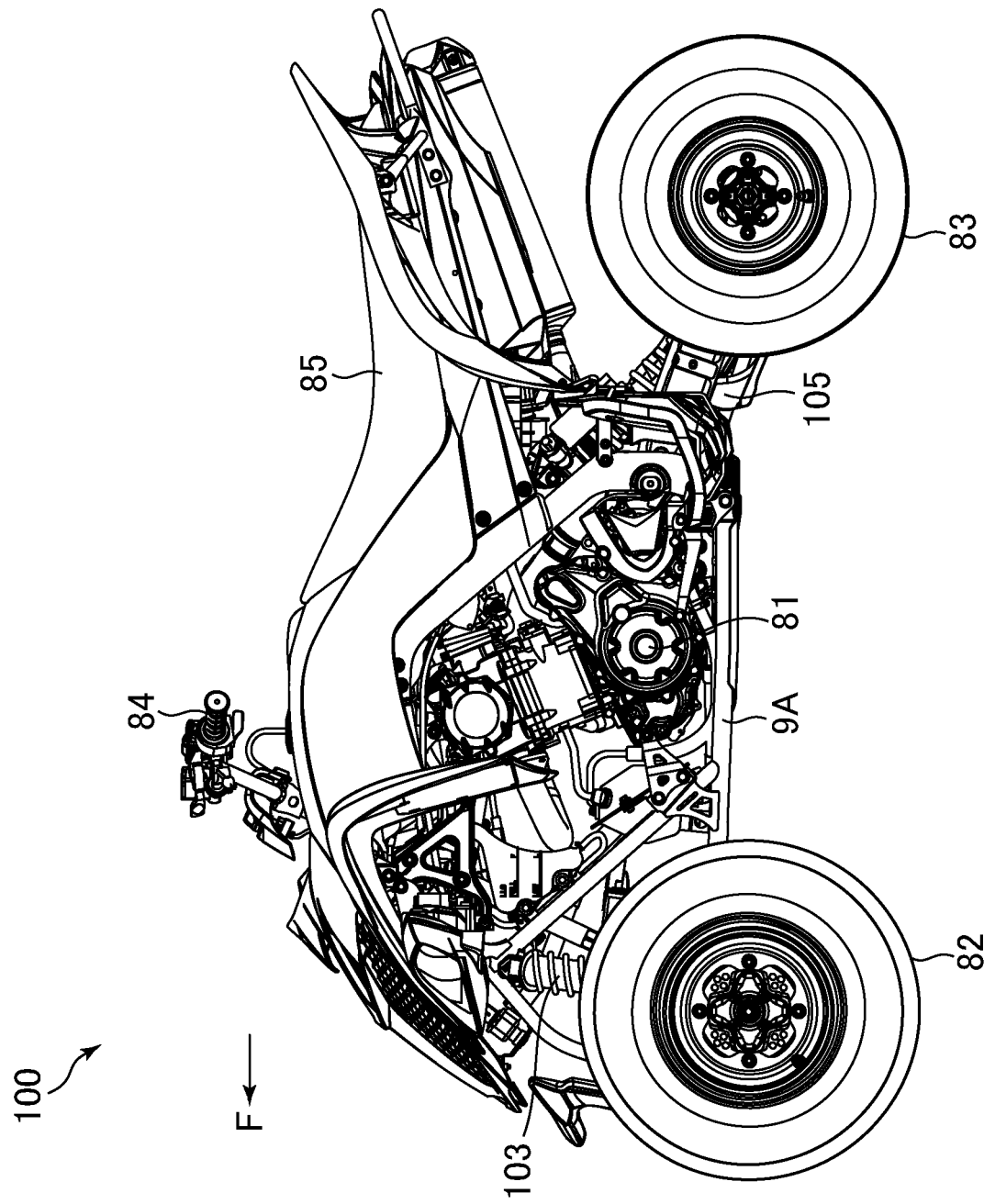
FIG. 12 is a left-side view of the ATV.

FIGS. 11 and 12 are a front view and a left-side view, respectively, of an ATV 100 according to a preferred embodiment of the present invention. The ATV 100 includes a vehicle body frame 9A. The engine 81 is supported on the vehicle body frame 9A so as to be inclined with the cylinder axis thereof extending upward and forward. The pair of front wheels 82 are mounted spaced apart from each other in the left-right direction in the lower front portion of the ATV 100, and the pair of rear wheels 83 are mounted spaced apart from each other in the left-right direction in the lower rear portion of the ATV 100.

The pair of front wheels 82 are connected to the vehicle body frame 9A through a pair of suspensions 110 spaced apart from each other in the left-right direction. The pair of suspensions 110 each includes the upper arm 101, the lower arm 102, and the shock absorber 103. The pair of rear wheels 83 are supported so as to move in the up-down direction by the rear arms 105 that are rotatably supported by the vehicle body frame 9A.

Figure 13:
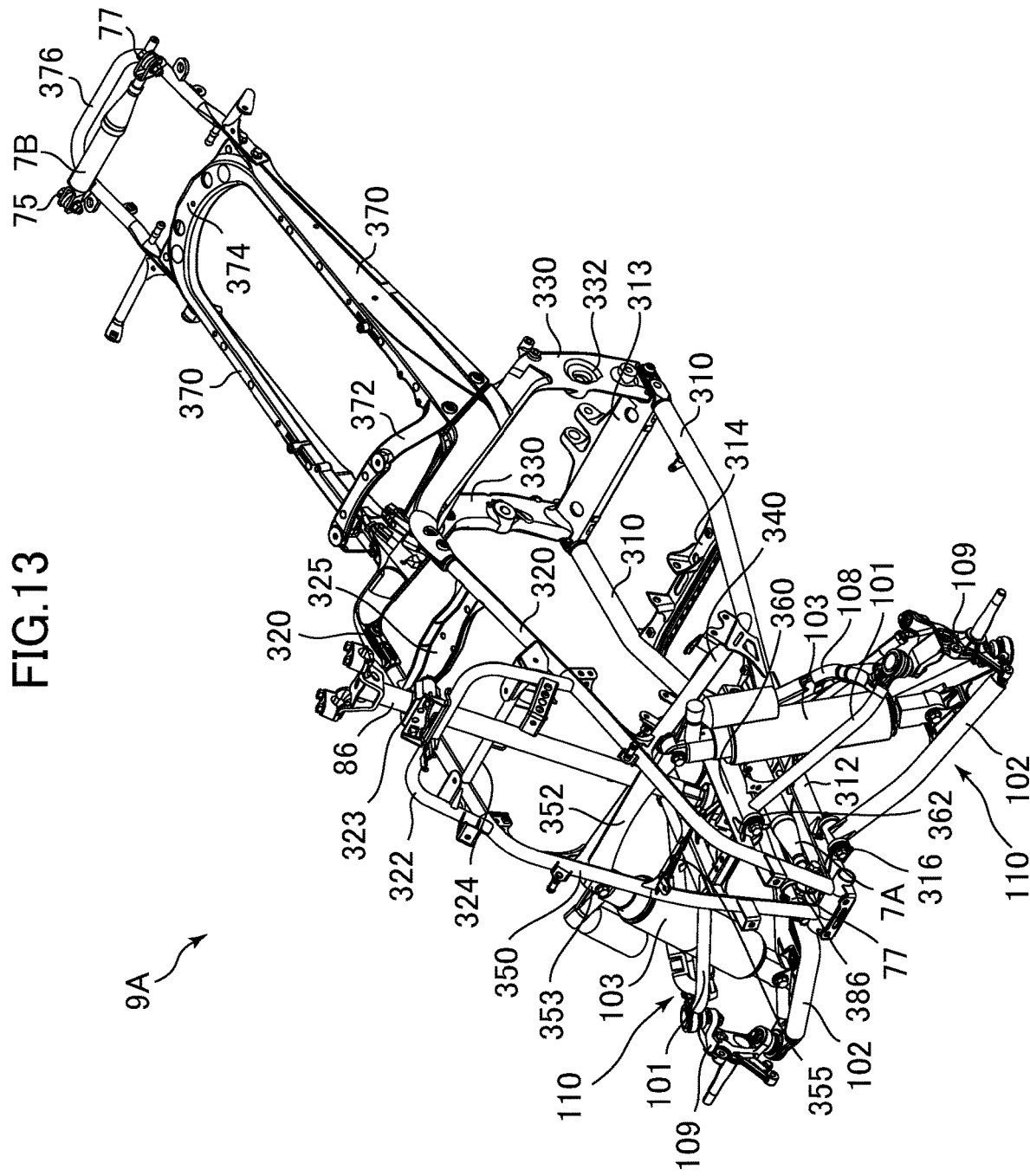
FIG. 13 is a perspective view of a vehicle body frame of the ATV, showing a first example of a vehicle body vibration control damper.
Figure 14:
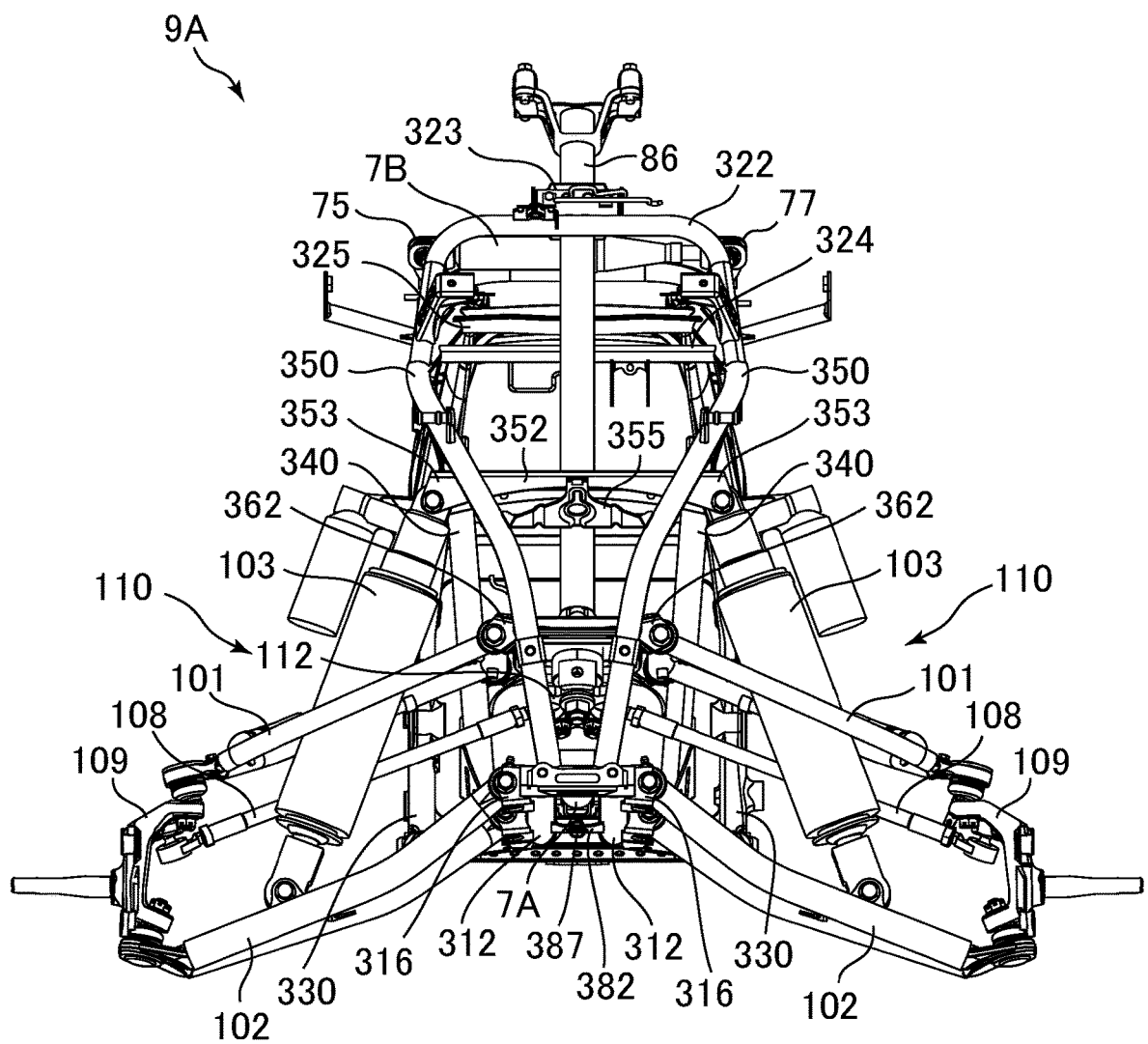
FIG. 14 is a front view of the front portion of the vehicle body frame.
Figure 15:
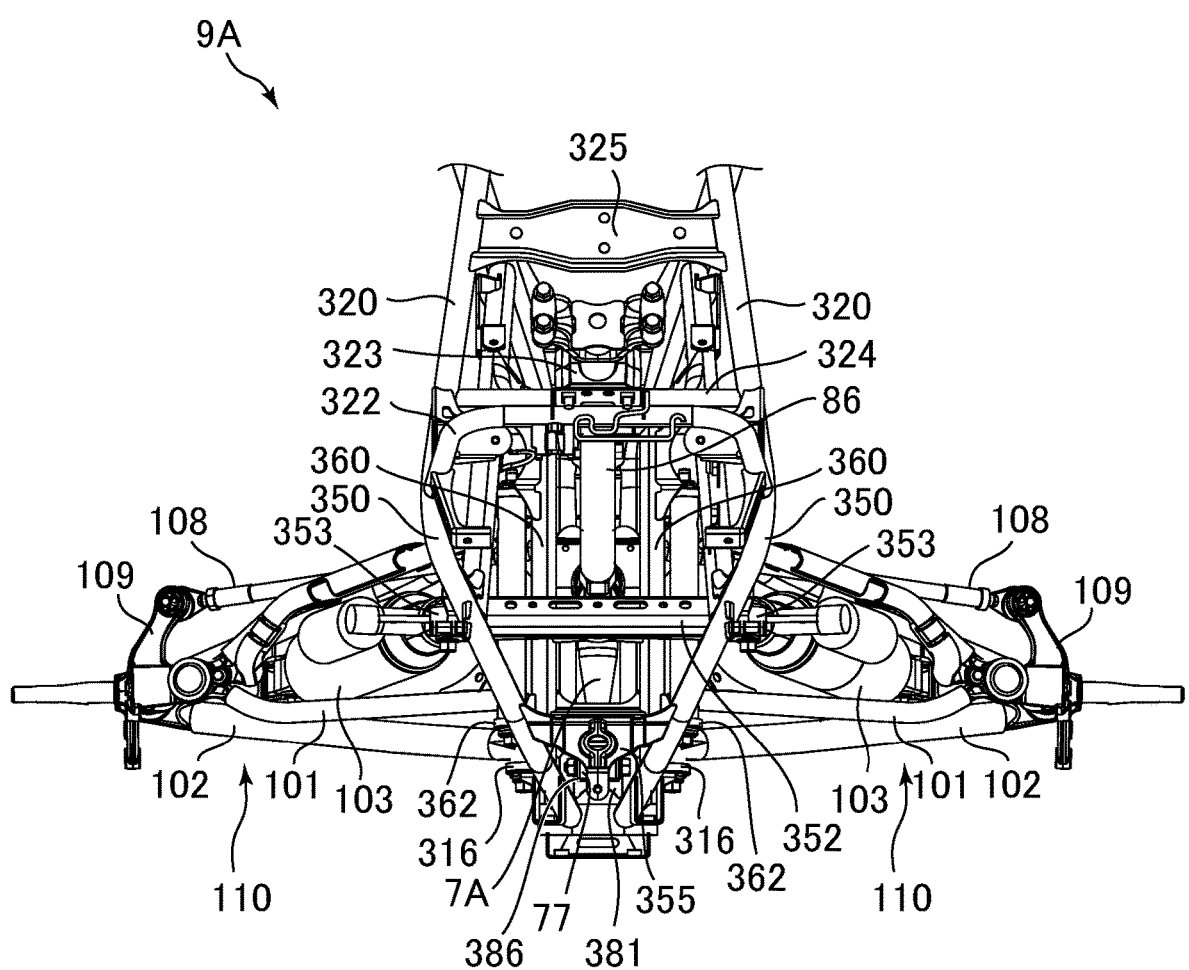
FIG. 15 is a plan view of the front portion of the vehicle body frame.
Figure 16:
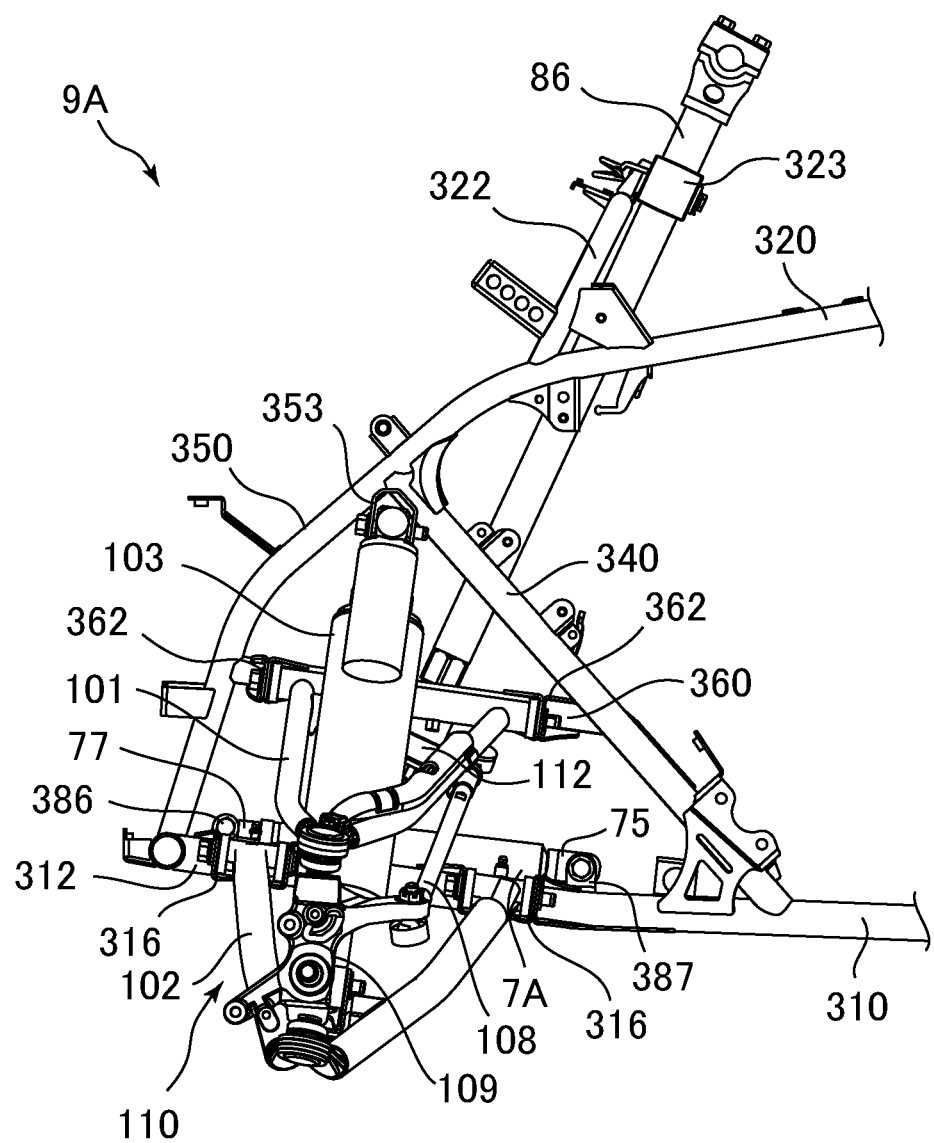
FIG. 16 is a left-side view of the front portion of the vehicle body frame.
Figure 17:
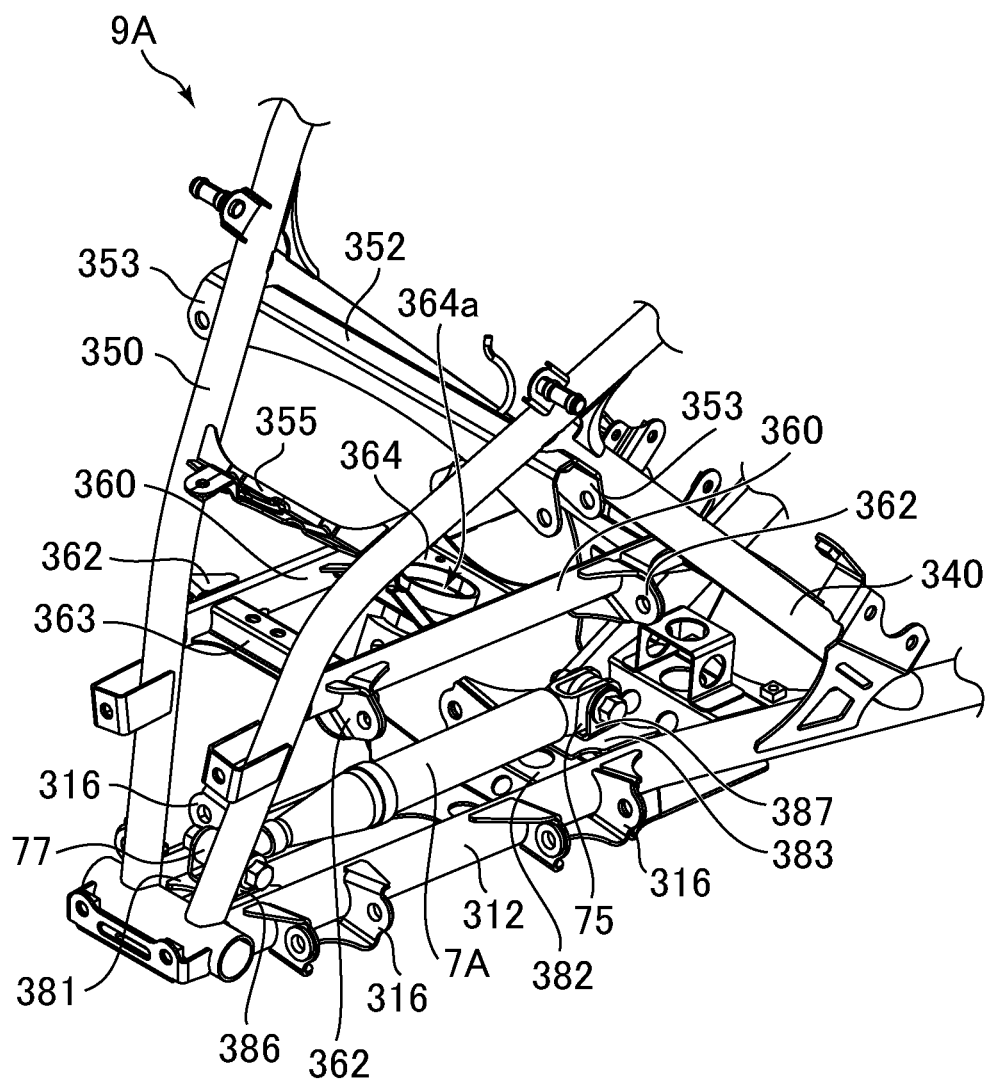
FIG. 17 is an enlarged view of the front portion of the vehicle body frame.
Figure 18:
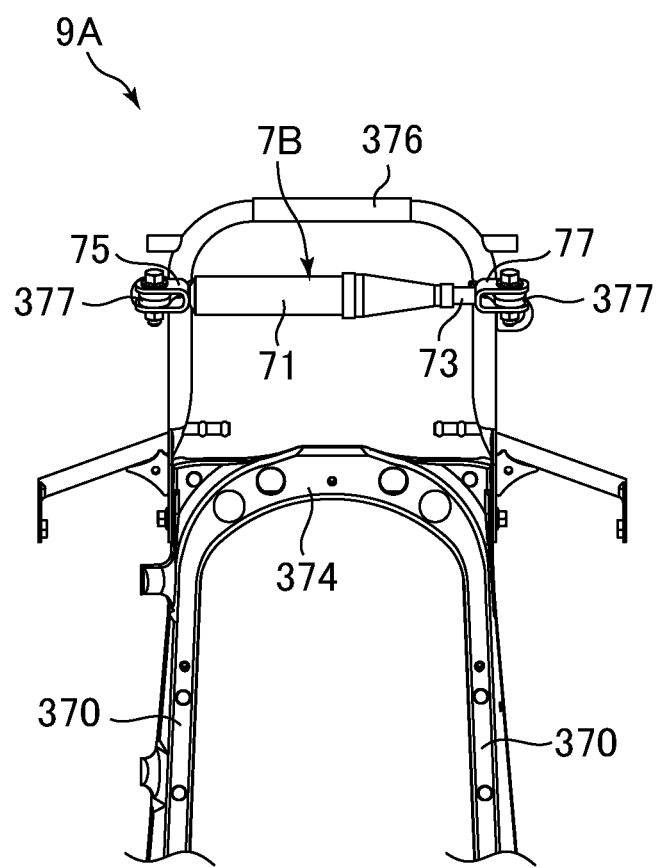
FIG. 18 is a plan view of the rear portion of the vehicle body frame.
Figure 19:
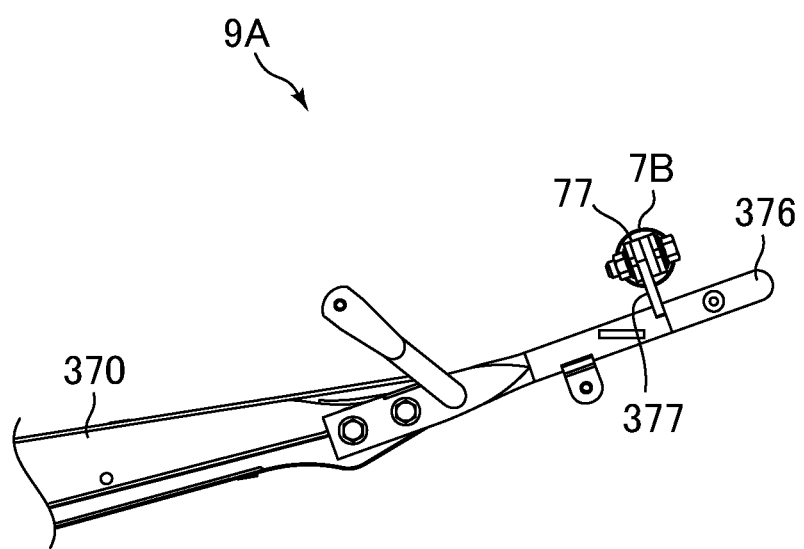
FIG. 19 is a left-side view of the rear portion of the vehicle body frame.

Below, a first example of the vehicle body vibration control damper 7 will be described. FIG. 13 is a perspective view of the entire vehicle body frame 9A. FIGS. 14 to 16 are a front view, a plan view, and a left-side view, respectively, of the front portion of the vehicle body frame 9A. FIG. 17 shows enlarged the major elements of the vehicle body frame 9A. FIGS. 18 and 19 are a plan view and a left-side view, respectively, of the rear portion of the vehicle body frame 9A. These figures illustrate the steering shaft 86, the suspensions 110, and the vehicle body vibration control dampers 7A, 7B mounted on the vehicle body frame 9A.

The vehicle body frame 9A includes lower frame portions 310, upper frame portions 320, rear frame portions 330, and front frame portions 350 all mounted so as to surround the engine 81 (see FIG. 12). The vehicle body frame 9A includes pillar portions 340 and beam portions 360 mounted between the front frame portions 350 and the engine 81. The vehicle body frame 9A includes seat rail portions 370 extending rearward from the respective rear frame portions 330. Each of these portions 310-370 include a pair of members spaced apart from each other in the left-right direction.

The lower frame portion 310 extends in the front-back direction. The interval in the left-right direction between the front portions of the lower frame portions 310 is shorter than that between the rear portions of the same. The front portions of the lower frame portions 310 define a pair of lower members 312 spaced apart from each other in the left-right direction, each including a bracket 316 to attach the lower arm 102.

Between the lower frame portions 310, a plurality of cross members 313, 314, 381 to 383 are provided. Among these members, the cross members 381 to 383 provided between the lower members 312 shown in FIG. 17 are used to attach the vehicle body vibration control damper 7A (to be described below in detail).

The rear frame portion 330 extends upward from the rear end portion of the lower frame portion 310 and then upward and forward. The rear frame portion 330 includes a support portion 332 thereon that supports a pivot axle (not shown) that rotatably supports the rear arm 105 (see FIG. 12).

The seat rail portion 370 extends rearward from the upper portion of the rear frame portion 330. Provided between the seat rail portions 370 are a plurality of cross members 372, 374. Provided on the rear end portions of the seat rail portions 370 is a grip bar 376. The grip bar 376 includes a vehicle body vibration control damper 7B attached thereto (to be described below in detail).

The upper frame portion 320 extends forward from the upper end portion of the rear frame portion 330. Between the upper frame portions 320, a plurality of cross members 322, 324, 325 are provided. On the foremost cross member 322, a head pipe 323 that rotatably supports the steering shaft 86 is mounted.

On the upper end portion of the steering shaft 86, a handle bar 84 (see FIGS. 11 and 12) is mounted. The steering shaft 86 extends downward and forward from the head pipe 323. The lower end portion of the steering shaft 86 is connected to a steering arm 112. The steering arm 112 is connected to a pair of tie rods 108. The tie rods 108 are connected to respective knuckles 109 that support the respective front wheels 82.

The front frame portion 350 extends downward and forward from the front end portion of the upper frame portion 320 to be connected to the front end portion of the lower frame portion 310. In the present preferred embodiment, the upper frame portion 320 and the front frame portion 350 are preferably made from a single metal pipe, for example. The boundary between the upper frame portion 320 and the front frame portion 350 is defined, for example, as a location where the cross member 322, to which the head pipe 323 is mounted, is connected to the frame.

Between the front frame portions 350, a plurality of cross members 352, 355 are provided. Each end portion of the upper cross member 352 projects outward from the front frame portion 350 in the left-right direction to define an attachment portion 353 to attach the shock absorber 103. Specifically, the attachment portion 353 is U-shaped or substantially U-shaped and opens downward in a side view and is fixed, for example, by a screw to the upper end portion of the shock absorber 103 inserted between the two portions defining the U-shaped portion.

The pillar portion 340 extends upward and forward from a midway portion of the lower frame portion 310 to be connected to the upper portion of the front frame portion 350. The upper end portion of the pillar portion 340 is fixed to both the front frame portion 350 and the cross member 352 by, for example, welding. The cross member 352 is sandwiched by the front frame portion 350 and the pillar portion 340. Note that the front portion of the vehicle body frame 9A refers to a portion of the vehicle body frame 9A located more forward than the pillar portion 94 in a side view, for example.

The beam portion 360 extends forward from a midway portion of the pillar portion 340 to be connected to the lower portion of the front frame portion 350. The beam portion 360 includes a bracket 362 attached thereto to connect to the upper arm 101. As shown in FIG. 17, a plurality of cross members 363, 364 are provided between the beam portions 360. The rear cross member 364 includes an opening 364a therein that receives the steering shaft 86.

In the first example, two vehicle body vibration control dampers 7A, 7B are mounted on the vehicle body frame 9A. Below, each of the vehicle body vibration control dampers 7A and 7B will be described.

Initially, the vehicle body vibration control damper 7A will be described. As shown in FIGS. 13 to 16, the vehicle body vibration control damper 7A is mounted in the front portion of the vehicle body frame 9A so as to extend in the front-back direction. The vehicle body vibration control damper 7A extending in the front-back direction means that the longitudinal direction, or the extension direction, of the vehicle body vibration control damper 7A is along the front-back direction.

The end portions of the vehicle body vibration control damper 7A are connected to the respective attachment portions (brackets) 386, 387 that are mounted on the vehicle body frame 9A so as to be spaced apart from each other in the front-back direction. Specifically, the cross members 381, 383 provided between the lower members 312 shown in FIG. 17 include two attachment portions 386, 387.

The cross members 381, 383 are preferably each made of a metal panel, and are mounted spaced apart from each other in the front-back direction. The cross members 381, 383 are fixed to the lower members 312 by welding, for example. The attachment portions 386, 387 as well are fixed to the cross members 381, 383, respectively, by welding, for example. This, however, is not limiting, and the attachment portions 386, 387 may be mounted on a single cross member.

Specifically, the cross member 383 is fixed to both the lower members 312 and the cross member 382 by welding, for example, where the attachment portion 387 is mounted on a cross member 382 provided between the lower members 312.

Each attachment portion 386, 387 is preferably U-shaped or substantially U-shaped and opens upward, and is fixed by, for example, a screw while sandwiching, by the two portions defining the U-shaped portion, a corresponding one of the attachment pieces 75, 77 attached to the respective end portions of the vehicle body vibration control damper 7A. This, however, is not limiting, and the attachment pieces 75, 77 of the vehicle body vibration control damper 7A may have a U-shape and sandwich the attachment portion 386, 387 by the two portions defining the U-shaped portion thereof.

The vehicle body vibration control damper 7A is mounted such that at least a portion thereof is located between the pair of suspensions 110. The entire vehicle body vibration control damper 7A may be located between the pair of suspensions 110.

Specifically, as shown in FIGS. 13 to 15, the vehicle body vibration control damper 7A is located more inward than the innermost end portions of the suspensions 110 in the left-right direction. In the present preferred embodiment, the innermost end portion of the suspension 110 is the innermost end portion of the lower arm 102 mounted on the bracket 316 of the lower member 312. The vehicle body vibration control damper 7A is located more inward in the left-right direction than the lower members 312 where the respective lower arms 102 are mounted.

As shown in FIG. 16, the vehicle body vibration control damper 7A overlaps the suspension 110 in a side view. Specifically, the vehicle body vibration control damper 7A overlaps at least one of the upper arm 101, the lower arm 102, and the shock absorber 103 in a side view. In the present preferred embodiment, each of the upper arm 101, the lower arm 102, and the shock absorber 103 overlaps in a side view the vehicle body vibration control damper 7A at any position within the moving range thereof.

The vehicle body vibration control damper 7A is located at the center of the ATV 100 in the vehicle width direction (the left-right direction). Specifically, as shown in FIGS. 13 to 15, the respective members of the vehicle body frame 9A, in particular, the lower members 312, are arranged symmetrically relative to the center line of the ATV 100 in the vehicle width direction, and the vehicle body vibration control damper 7A is mounted on the center line of the ATV 100 in the vehicle width direction between the lower members 312.

As shown in FIG. 15, the vehicle body vibration control damper 7A overlaps in a plan view the steering shaft 86 mounted at the center of the ATV 100 in the vehicle width direction. Specifically, the vehicle body vibration control damper 7A is mounted such that at least a portion of the rear half portion thereof overlaps the steering shaft 86 in a plan view.

The vehicle body vibration control damper 7A is mounted at a position vertically between where the lower arms 102 are mounted and where the upper arms 101 are mounted in the front portion of the vehicle body frame 9A. Specifically, as shown in FIG. 16, the vehicle body vibration control damper 7A is located in a side view between the lower member 312 where the lower arm 102 is mounted and the beam portion 360 where the upper arm 101 is mounted.

That is, the vehicle body vibration control damper 7A is located above the lower member 312 and below the beam portion 360 in a side view. The vehicle body vibration control damper 7A may at least partially overlap the lower member 312 in a side view. The vehicle body vibration control damper 7A is located behind the front frame portion 350 and ahead of the pillar portion 340 in a side view.

The vehicle body vibration control damper 7A is connected to the attachment portion 386 located more forward than the lower end portion of the steering shaft 86 and to the attachment portion 387 located more rearward than the same. The lower end portion of the steering shaft 86 is located lower than the beam portion 360 where the upper arm 101 is mounted and close to the vehicle body vibration control damper 7A. The lower end portion of the steering shaft 86 refers to, for example, a portion where the steering arm 112 is connected.

As shown in FIG. 16, the attachment portion 386 where the front end portion of the vehicle body vibration control damper 7A is mounted may be located more forward than the foremost end portion of the suspension 110 (for example, the foremost end portion of the lower arm 102). The attachment portion 387 where the rear end portion of the vehicle body vibration control damper 7A is mounted may be located more rearward than the rearmost end portion of the suspension 110 (for example, the rearmost end portion of the lower arm 102).

Next, the vehicle body vibration control damper 7B will be described. As shown in FIGS. 13, 18 and 19, the vehicle body vibration control damper 7B is mounted near the rear end portion of the vehicle body frame 9A so as to extend in the left-right direction. Specifically, the vehicle body vibration control damper 7B is mounted on a member located at the rear end of the ATV 100, specifically, the grip bar 376 in the present preferred embodiment. Alternatively, the member located at the rear end of the ATV 100 may be a cross member 374 mounted on the rear end portions of the seat rail portions 370.

The grip bar 376 is preferably U-shaped or substantially U-shaped and opens forward, and is fixed by, for example, a screw or by welding to the rear end portions of the seat rail portions 370. Although the seat rail portions 370 and the grip bar 376 are separate in the present preferred embodiment, these may be integral. In other words, the cross member 374 mounted on the rear end portions of the seat rail portions 370 may be a grip bar, and no separate grip bar 376 may be provided.

The respective end portions of the vehicle body vibration control damper 7B are connected to attachment portions (brackets) 377 mounted on the grip bar 376 so as to be spaced apart from each other in the left-right direction. Specifically, the attachment portion 377 is fixed by, for example, welding to each of the left and right portions of the U-shaped grip bar 376 spaced apart from each other in the left-right direction. Each attachment portion 377 is mounted so as to project upward from the grip bar 376.

In the above described first example, as shown in FIGS. 13 to 16, the vehicle body vibration control damper 7A is connected, via the respective end portions thereof, to the respective attachment portions 386, 387 mounted on the vehicle body frame 9A so as to be spaced apart from each other in the front-back direction, and is mounted so as to extend in the front-back direction with at least a portion thereof located between the pair of suspensions 110. With the above, the arrangement of the vehicle body vibration control damper 7A between the suspensions 110 enables quick damping of the vibrations propagated from the suspensions 110 to the vehicle body frame 9A.

In particular, as the front wheels 82 of the ATV 100 receive a large reaction force from the ground surface, the front portion (in particular the front lower portion) of the vehicle body frame 9A is designed so as to have the smallest possible width in order to ensure the longest possible upper arms 101 and lower arms 102. In the first example, an arrangement of the vehicle body vibration control damper 7A extending in the front-back direction allows the vehicle body vibration control damper 7A to be mounted between the suspensions 110 even in the front portion of the vehicle body frame 9A having such a narrow width.

In the first example, the vehicle body vibration control damper 7A is connected to the attachment portions 386, 387 mounted on the respective cross members 381, 382 (see FIG. 17) between the pair of lower members 312 where the lower arms 102 are mounted. This allows the vehicle body vibration control damper 7A to be mounted between the suspensions 110 along the center line of the ATV 100 in the left-right direction.

In the first example, the vehicle body vibration control damper 7A is mounted at a position vertically between where the lower arms 102 are mounted and where the upper arms 101 are mounted in the front portion of the vehicle body frame 9A. This enables quick damping of the vibrations propagated therefrom, in particular, the upper arms 101 and the lower arms 102 of the suspensions 110 to the vehicle body frame 9A.

In the first example, the vehicle body vibration control damper 7A is connected to the attachment portion 386 located more forward than the lower end portion of the steering shaft 86 and the attachment portion 387 located more rearward than the same. This allows the vehicle body vibration control damper 7A to be mounted in a large area in the front portion of the vehicle body frame 9A to quickly damp the vibrations propagated from the suspensions 110 to the vehicle body frame 9A.

In the first example, the vehicle body vibration control damper 7B is mounted more rearward than the vehicle body vibration control damper 7A mounted in the front portion of the vehicle body frame 9A. With the above structure, it is possible to damp the vibrations propagated from the vehicle body frame 9A through the seat 85 to the driver by the vehicle body vibration control damper 7B, while quickly damping the variations propagated from the suspensions 110 to the vehicle body frame 9A by the vehicle body vibration control damper 7A.

In the first example, the vehicle body vibration control damper 7B is mounted so as to extend in the left-right direction. That is, the vehicle body vibration control damper 7A extends in the front-back direction, while the vehicle body vibration control damper 7B extends in the left-right direction such that these two vehicle body vibration control dampers 7A, 7B are arranged in a letter T to extend in different directions. With this arrangement, it is possible to damp vibrations in various directions in the vehicle body frame 9A.

In the first example, the vehicle body vibration control damper 7B is connected to the attachment portions 377 mounted on the grip bar 376, that is, a member located at the rear end of the ATV 100, so as to be spaced apart from each other in the left-right direction. Although a member located at the rear end of the ATV 100 may likely vibrate to a large extent since the seat rail portion 370 is cantilevered, the vibrations in the seat rail portion 370 are damped by the vehicle body vibration control damper 7B mounted on that member.

Figure 20:
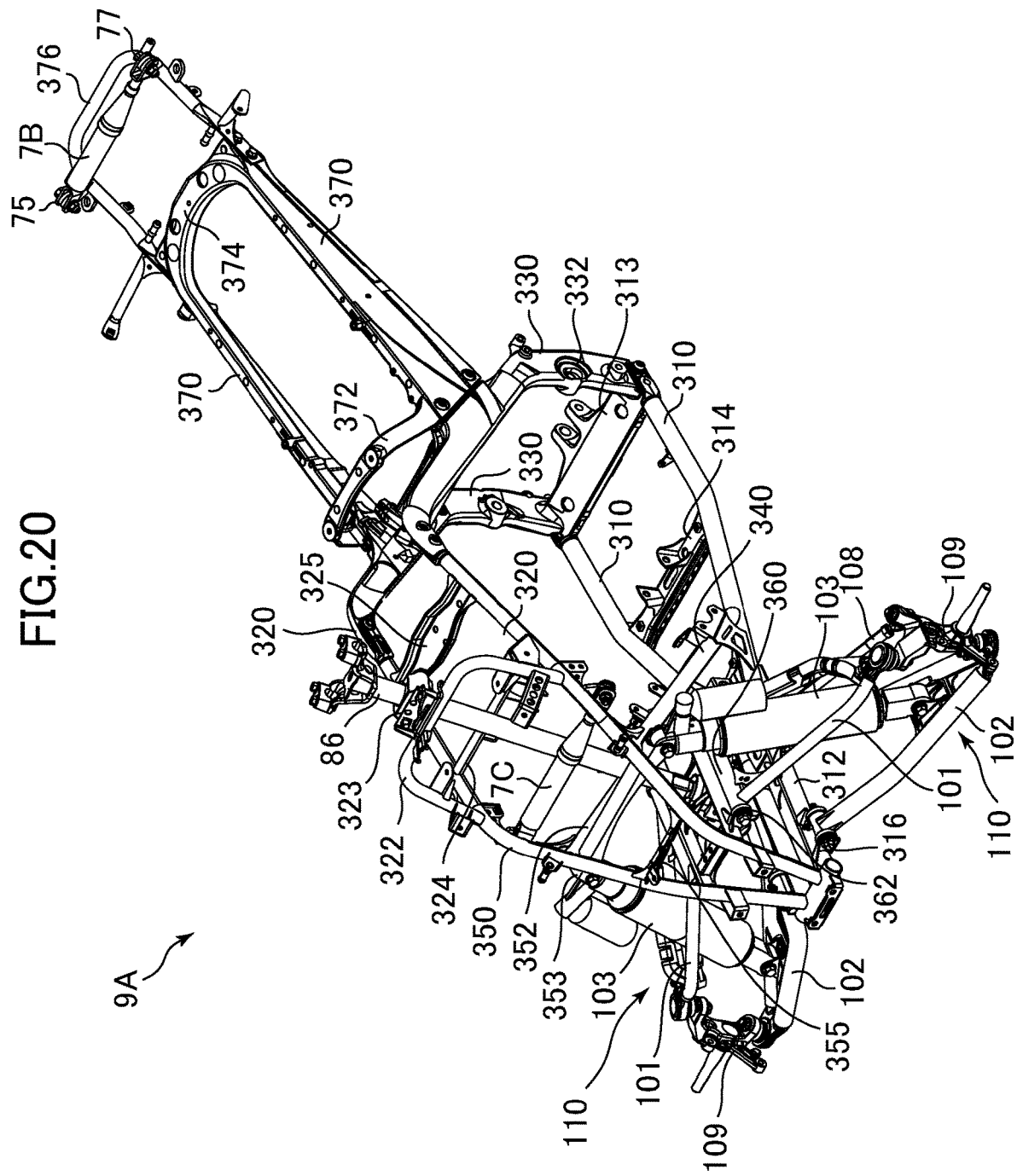
FIG. 20 is a perspective view of a vehicle body frame of the ATV, showing a second example of a vehicle body vibration control damper.
Figure 21:
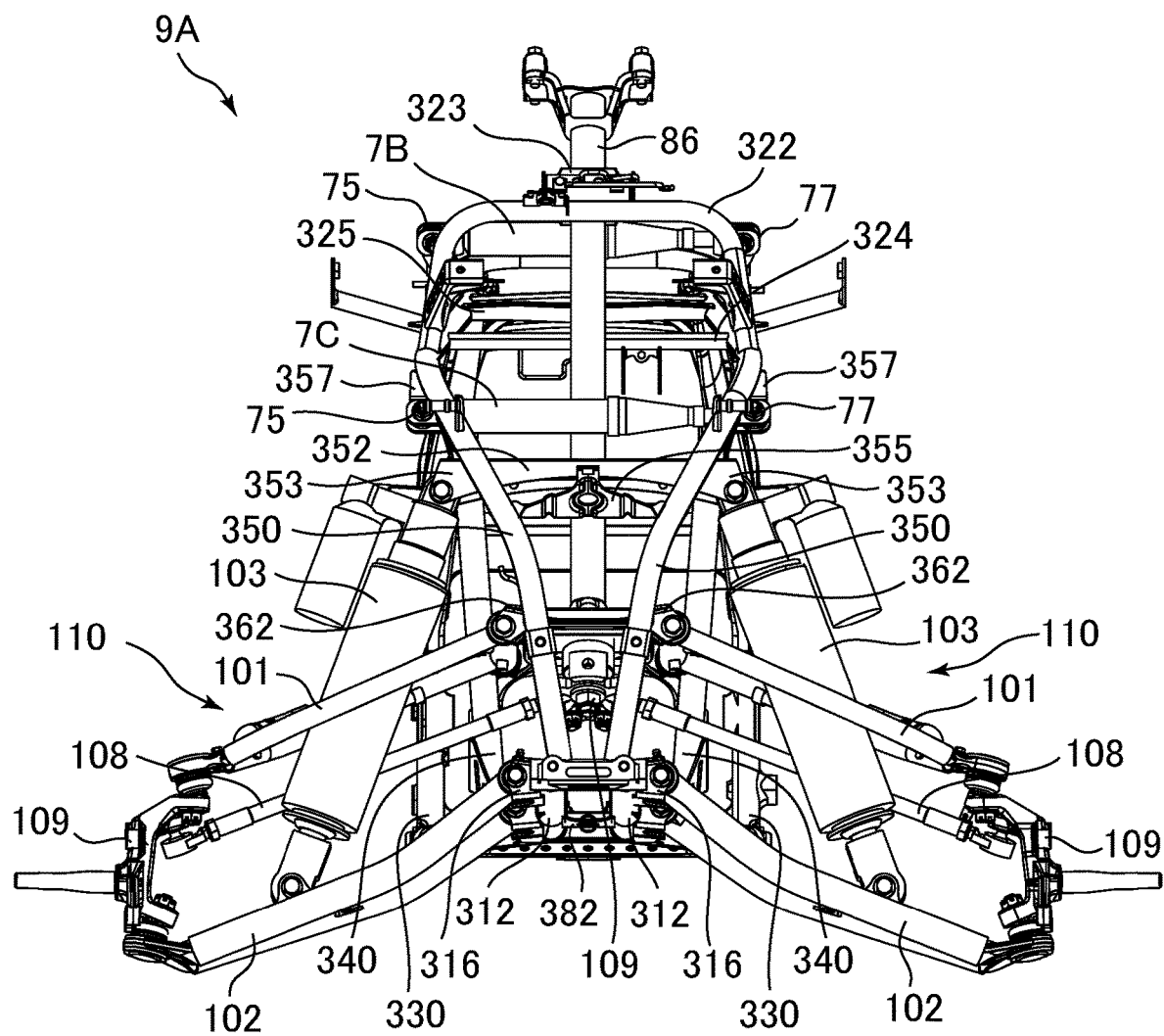
FIG. 21 is a front view of the front portion of the vehicle body frame.
Figure 22:
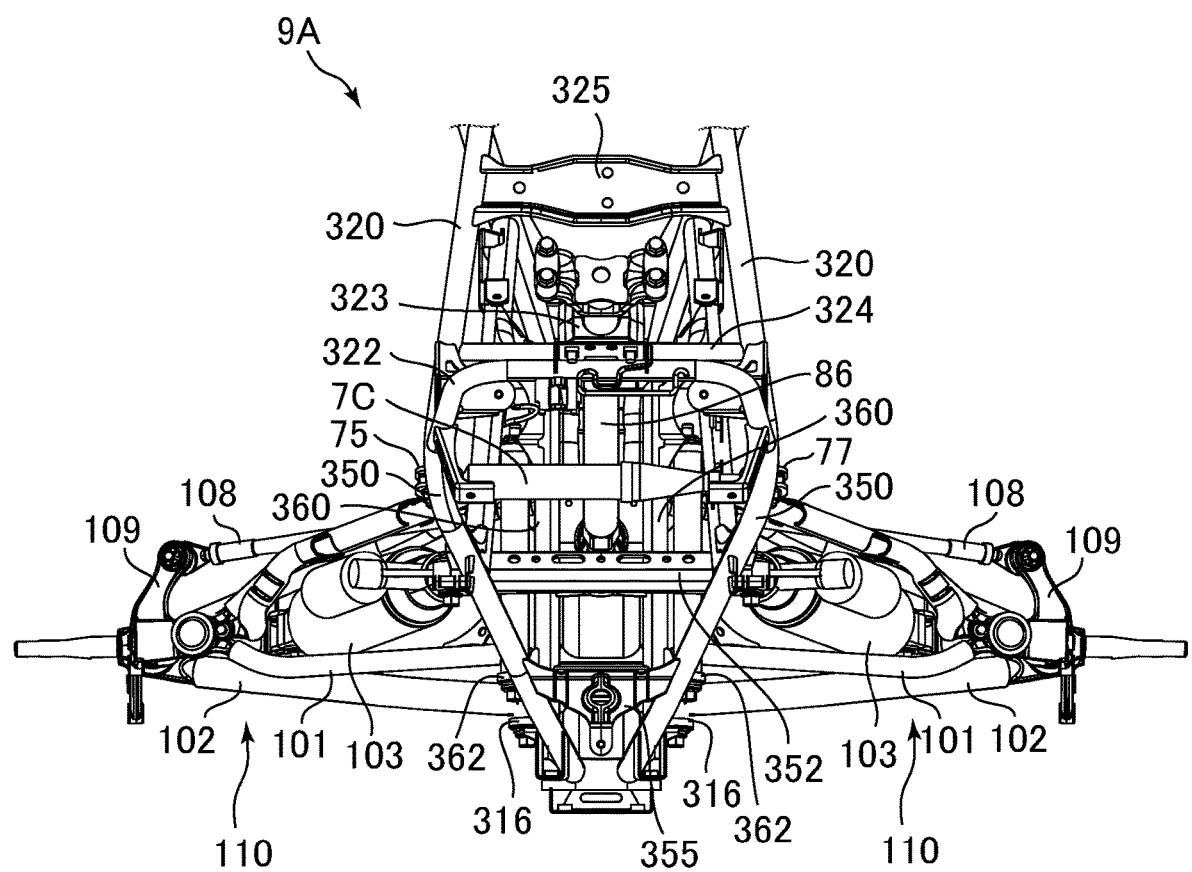
FIG. 22 is a plan view of the front portion of the vehicle body frame.
Figure 23:
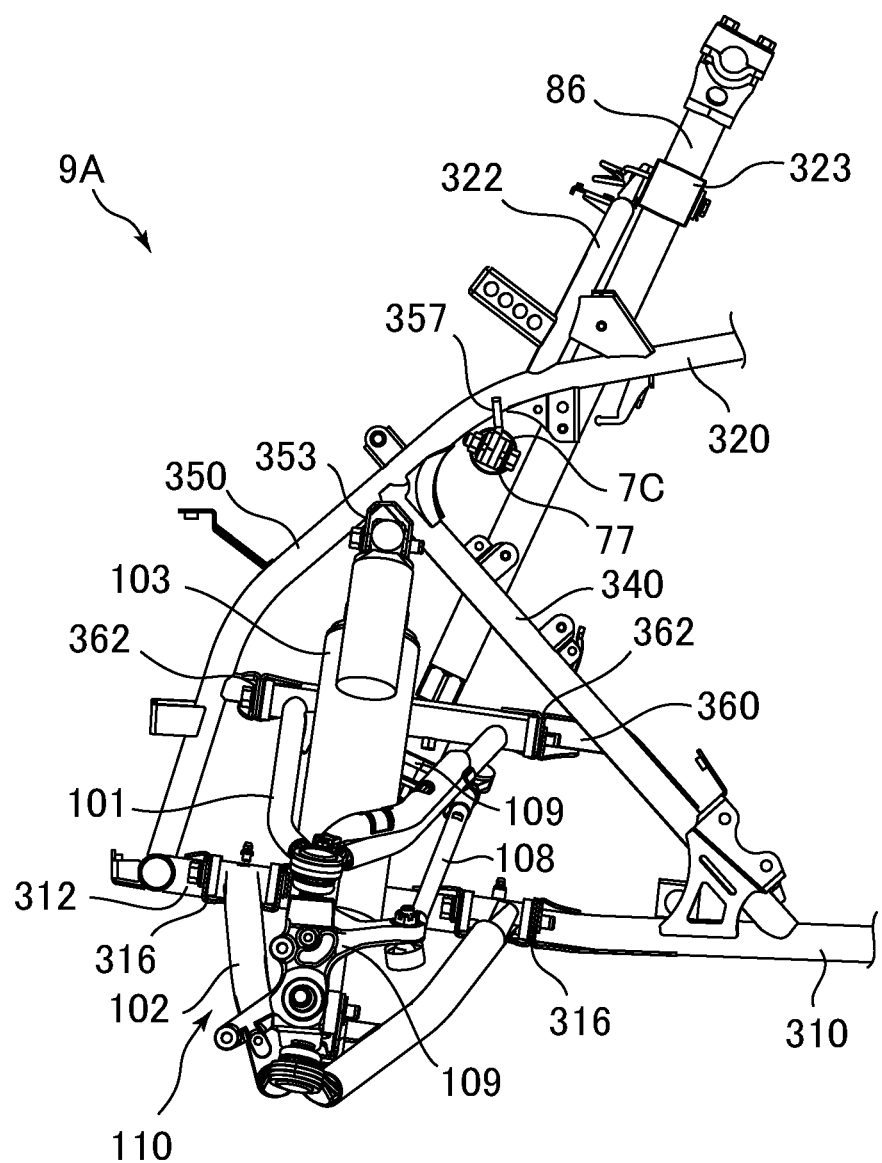
FIG. 23 is a left-side view of the front portion of the vehicle body frame.

Below, a second example of the vehicle body vibration control damper 7 will be described. FIG. 20 is a perspective view of the vehicle body frame 9A. FIGS. 21 to 23 are a front view, a plan view, and a left-side view, respectively, of the vehicle body frame 9A. These figures illustrate the steering shaft 86, the suspensions 110, and the vehicle body vibration control dampers 7C, 7B mounted on the vehicle body frame 9A.

In the second example, two vehicle body vibration control dampers 7C, 7B are mounted on the vehicle body frame 9A. Below, the vehicle body vibration control damper 7C will be described, with the vehicle body vibration control damper 7B, similar to that in the first example, not described again.

The vehicle body vibration control damper 7C is mounted so as to extend in the left-right direction between the pair of attachment portions 353 where the shock absorbers 103 are attached and the handle bar 84 mounted on the upper end portion of the steering shaft 86 (see FIGS. 11 and 12). Specifically, the vehicle body vibration control damper 7C is mounted on a midway portion on a path from the attachment portion 353 to the handle bar 84 via the front frame portion 350, the cross member 322, the head pipe 323, and the steering shaft 86.

The distance between the vehicle body vibration control damper 7C and the handle bar 84 is shorter than the distance between the handle bar 84 and the attachment portion 353. The distance between the vehicle body vibration control damper 7C and the attachment portion 353 is shorter than the distance between the handle bar 84 and the attachment portion 353.

The respective end portions of the vehicle body vibration control damper 7C are connected to attachment portions (brackets) 357 mounted on the respective front frame portions 350 of the vehicle body frame 9A so as to be spaced apart from each other in the left-right direction. The attachment portion 357 is mounted on the front frame portion 350 within a range between the attachment portion 353 where the shock absorber 103 is attached and the cross member 322.

The attachment portion 357 projects downward from a portion of the front frame portion 350 that extends downward and forward. Thus, the vehicle body vibration control damper 7C is mounted below and behind the front frame portion 350. In other words, the front frame portion 350 is mounted above and ahead of the vehicle body vibration control damper 7C.

As shown in FIG. 23, the vehicle body vibration control damper 7C is mounted in a triangular shaped area defined by the front frame portion 350, the pillar portion 340, and the steering shaft 86 in a side view. That is, the vehicle body vibration control damper 7C is mounted above and behind the pillar portion 340 and ahead of the steering shaft 86.

In the second example described above, as shown in FIGS. 20 to 23, the vehicle body vibration control damper 7C is mounted so as to extend in the left-right direction between the attachment portions 353 where the shock absorbers 103 are attached and the handle bar 84 mounted on the upper end portion of the steering shaft 86 (see FIGS. 11 and 12). This arrangement enables damping of the vibrations propagated from the suspensions 110 (in particular, the shock absorbers 103) to the vehicle body frame 9A before the vibrations reach the handle bar 84.

In particular, the pair of front wheels 82 of the ATV 100 often receive reaction forces from the ground surface that are mutually different in magnitude, and it is expected that vibrations twisting in the roll direction are likely caused in the vehicle body frame 9A. In the second example, the vehicle body vibration control damper 7C extends in the left-right direction so that such vibrations are efficiently damped.

In the second example, the vehicle body vibration control damper 7C is connected to the attachment portions 357 each projecting downward from a portion of the front frame portion 350 that extends downward and forward. With the above structure, since the vehicle body vibration control damper 7C is mounted below and behind the front frame portions 350, it is possible to protect the vehicle body vibration control damper 7C, and to prevent external accessories from affecting the design. Moreover, the triangular shaped area defined by the front frame portion 350, the pillar portion 340, and the steering shaft 86 in a side view is effectively utilized.

Figure 24:
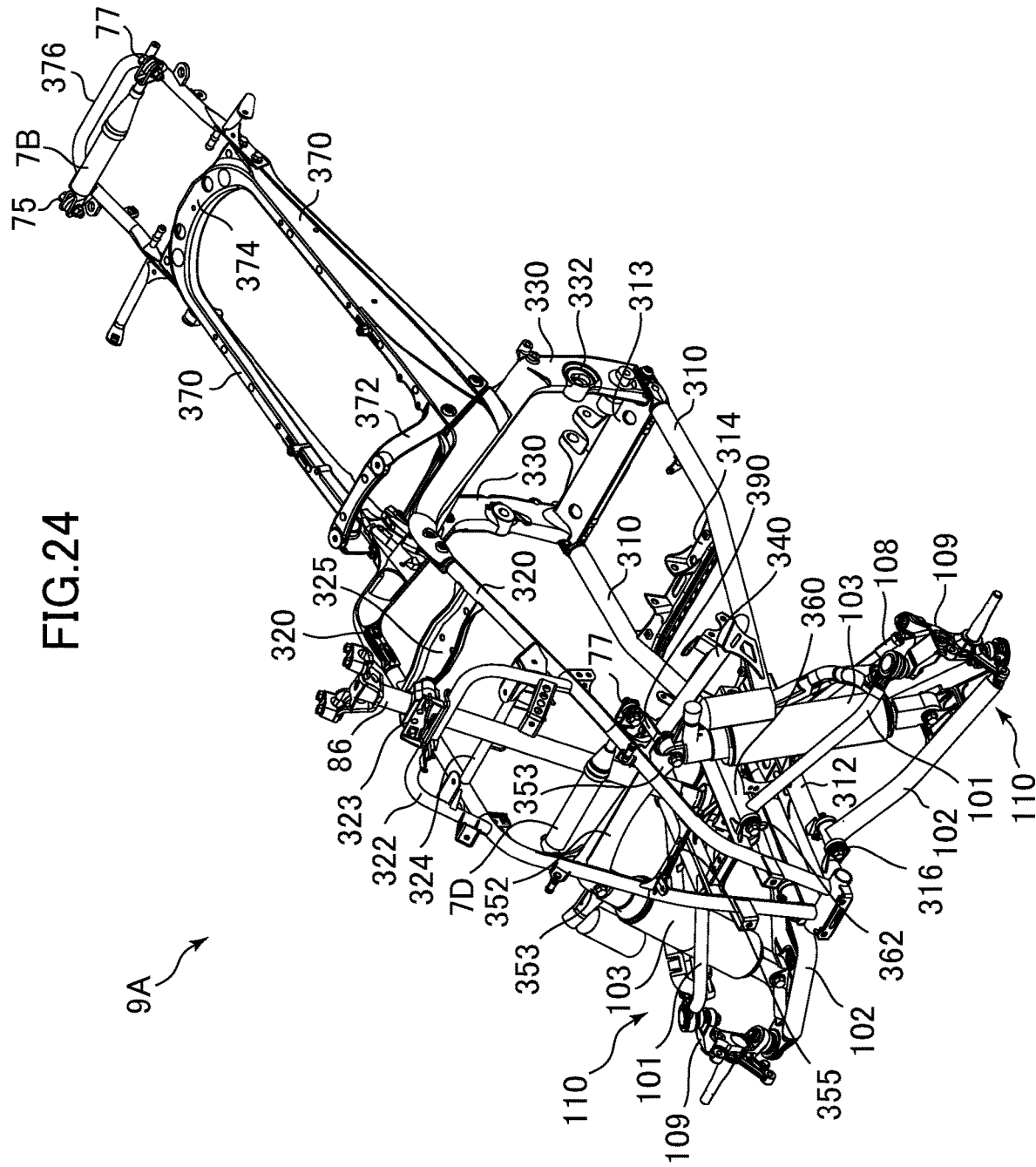
FIG. 24 is a perspective view of a vehicle body frame of the ATV, showing a third example of a vehicle body vibration control damper.
Figure 25:
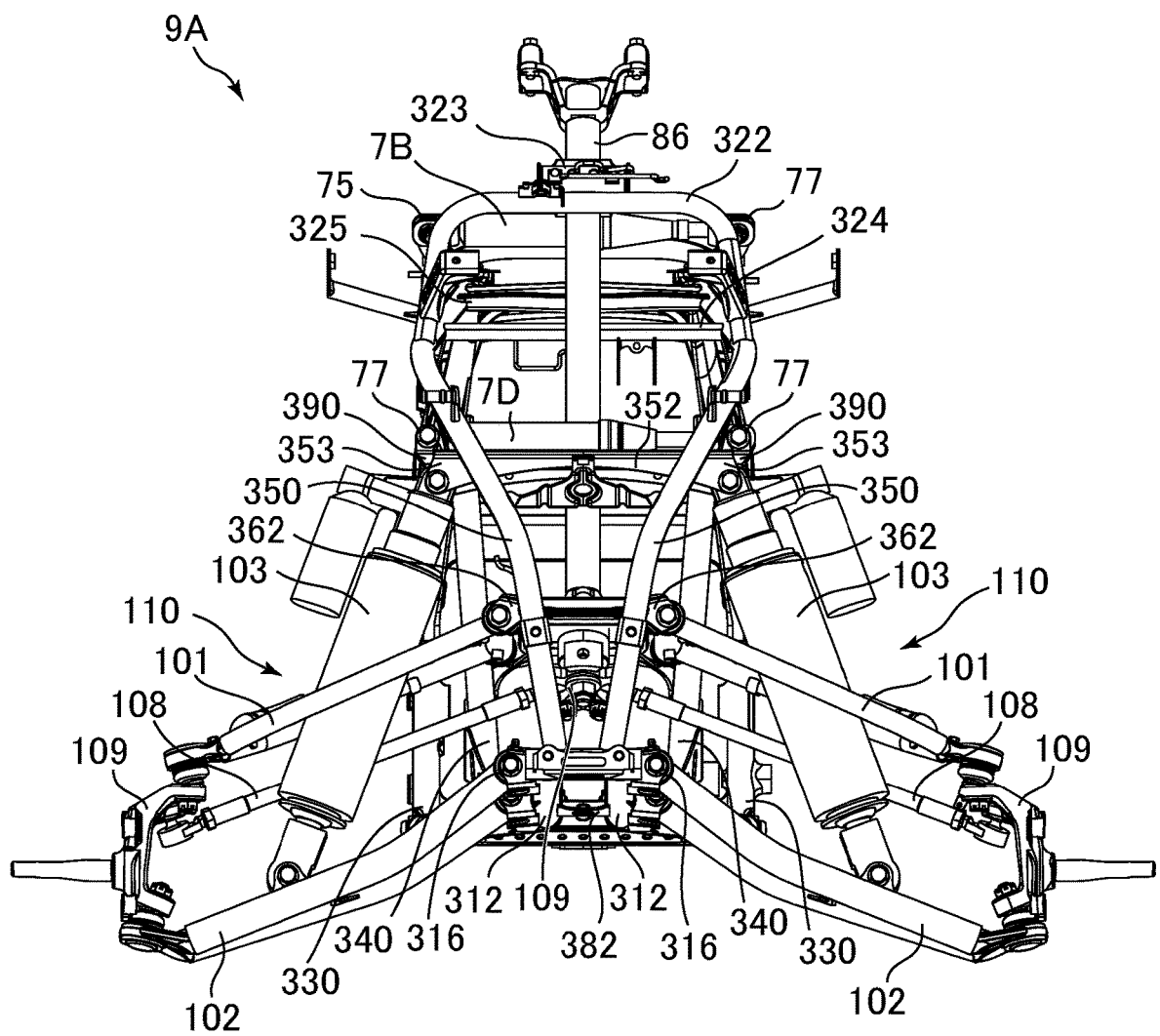
FIG. 25 is a front view of the front portion of the vehicle body frame.
Figure 26:
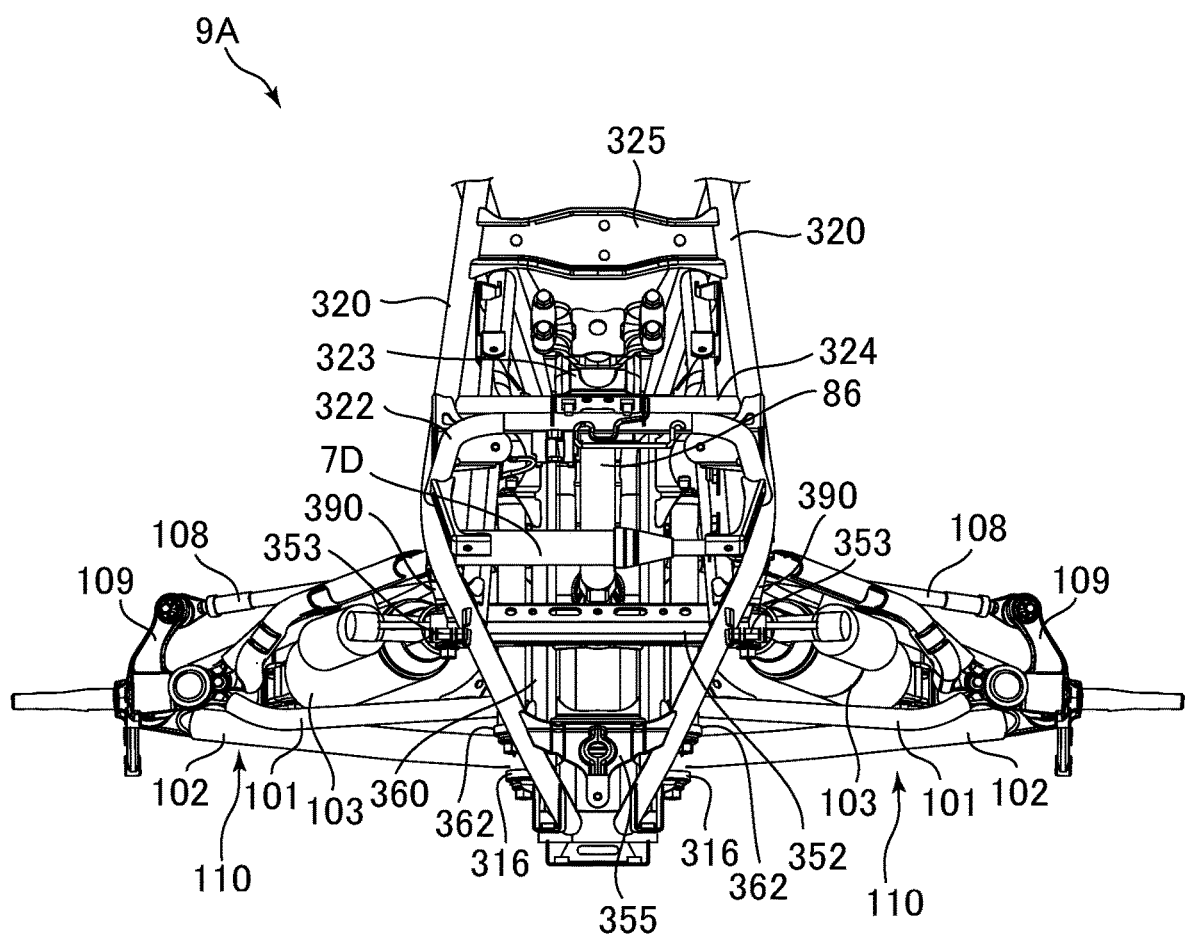
FIG. 26 is a plan view of the front portion of the vehicle body frame.
Figure 27:
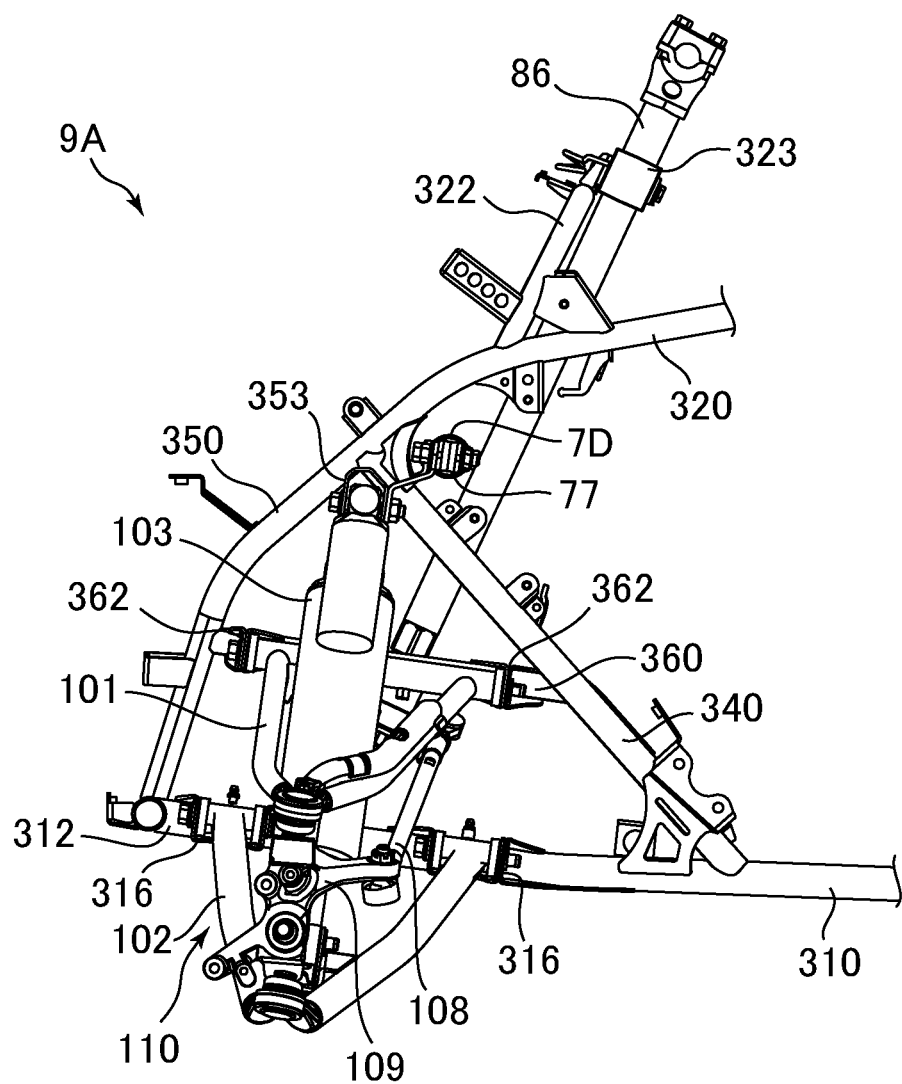
FIG. 27 is a left-side view of the front portion of the vehicle body frame.
Figure 28:
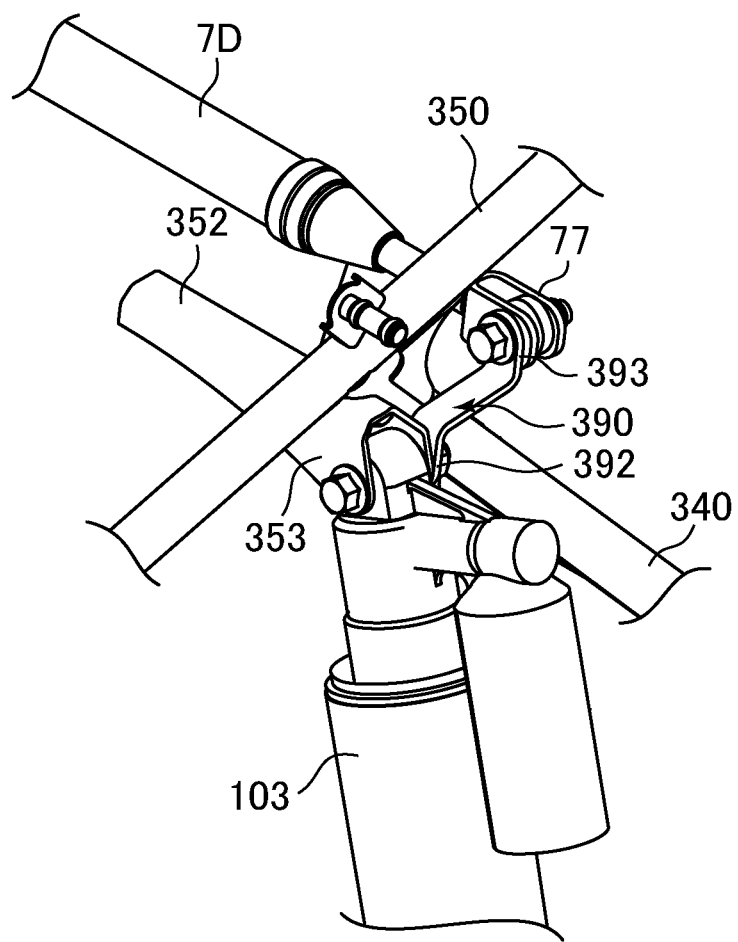
FIG. 28 is an enlarged view of the front portion of the vehicle body frame.

Below, a third example of the vehicle body vibration control damper 7 will be described. FIG. 24 is a perspective view of the vehicle body frame 9A. FIGS. 25 to 27 are a front view, a plan view, and a left-side view, respectively, of the vehicle body frame 9A. FIG. 28 shows enlarged the major elements of the vehicle body frame 9A. These figures show the steering shaft 86, the suspensions 110, and the vehicle body vibration control dampers 7D, 7B mounted on the vehicle body frame 9A.

In the third example, two vehicle body vibration control dampers 7D, 7B are mounted on the vehicle body frame 9A. In the following, the vehicle body vibration control damper 7D will be described, with the vehicle body vibration control damper 7B, similar to the above described first and second examples, not described again.

The vehicle body vibration control damper 7D is connected, via the end portions thereof, to a pair of attachment portions (brackets) 390 mounted on the vehicle body frame 9A so as to be spaced apart from each other in the left-right direction, and is mounted so as to extend in the left-right direction. These attachment portions 390 are fastened by, for example, a screw to a pair of attachment portions 353 and the respective shock absorbers 103 at a location where the respective shock absorbers 103 are attached to the pair of attachment portions 353.

As shown in FIG. 28, the attachment portion 390 is preferably made of a metal piece folded into a Z-shape, with one end portion 392 attached to the attachment portion 353 together with the shock absorber 103 by, for example, a screw, and the other end portion 393 attached to the attachment piece 77 of the vehicle body vibration control damper 7 by, for example, a screw.

Specifically, the front end portion 392 of the attachment portion 390 contacts the rear surface of the U-shaped attachment portion 353, and is attached together with the shock absorber 103. The attachment portion 390 extends rearward from the attachment portion 353 to support the vehicle body vibration control damper 7D at a location more rearward than the attachment portion 353. Meanwhile, the rear end portion 393 of the attachment portion 390 contacts, and is attached to, the front surface of the attachment piece 77 of the vehicle body vibration control damper 7D.

The vehicle body vibration control damper 7D is mounted between the pair of attachment portions 353 where the shock absorbers 103 are attached and the handle bar 84 mounted on the upper end portion of the steering shaft 86 (see FIGS. 11 and 12). The distance between the vehicle body vibration control damper 7D and the handle bar 84 is shorter than the distance between the handle bar 84 and the attachment portion 353. The distance between the vehicle body vibration control damper 7D and the attachment portion 353 is shorter than the distance between the handle bar 84 and the attachment portion 353.

The vehicle body vibration control damper 7D is mounted below and behind the front frame portion 350. That is, the front frame portion 350 is located above and ahead of the vehicle body vibration control damper 7D. As shown in FIG. 27, the vehicle body vibration control damper 7D is mounted in a triangular shaped area defined by the front frame portion 350, the pillar portion 340, and the steering shaft 86 in a side view.

In the above described preferred embodiment, as shown in FIGS. 24 to 28, the pair of attachment portions 390 are attached to the pair of attachment portions 353 that attach the respective shock absorbers 103, together with the respective shock absorbers 103, and the vehicle body vibration control damper 7D is connected to these attachment portions 390. This enables quick and direct damping of the vibrations propagated from the shock absorbers 103 to the vehicle body frame 9A.

In particular, the pair of front wheels 82 of the ATV 100 often receive reaction forces from the ground surface that are mutually different in magnitude, and it is expected that vibrations twisting in the roll direction are likely caused in the vehicle body frame 9A. In the third example, the vehicle body vibration control damper 7D is mounted so as to extend in the left-right direction so that such vibrations are efficiently damped.

In the third example, as the vehicle body vibration control damper 7D is mounted below and behind the front frame portion 350, it is possible to protect the vehicle body vibration control damper 7D, and to prevent external accessories from affecting the design. In addition, the triangular shaped area defined by the front frame portion 350, the pillar portion 340, and the steering shaft 86 in a side view is efficiently utilized.

Figure 29:
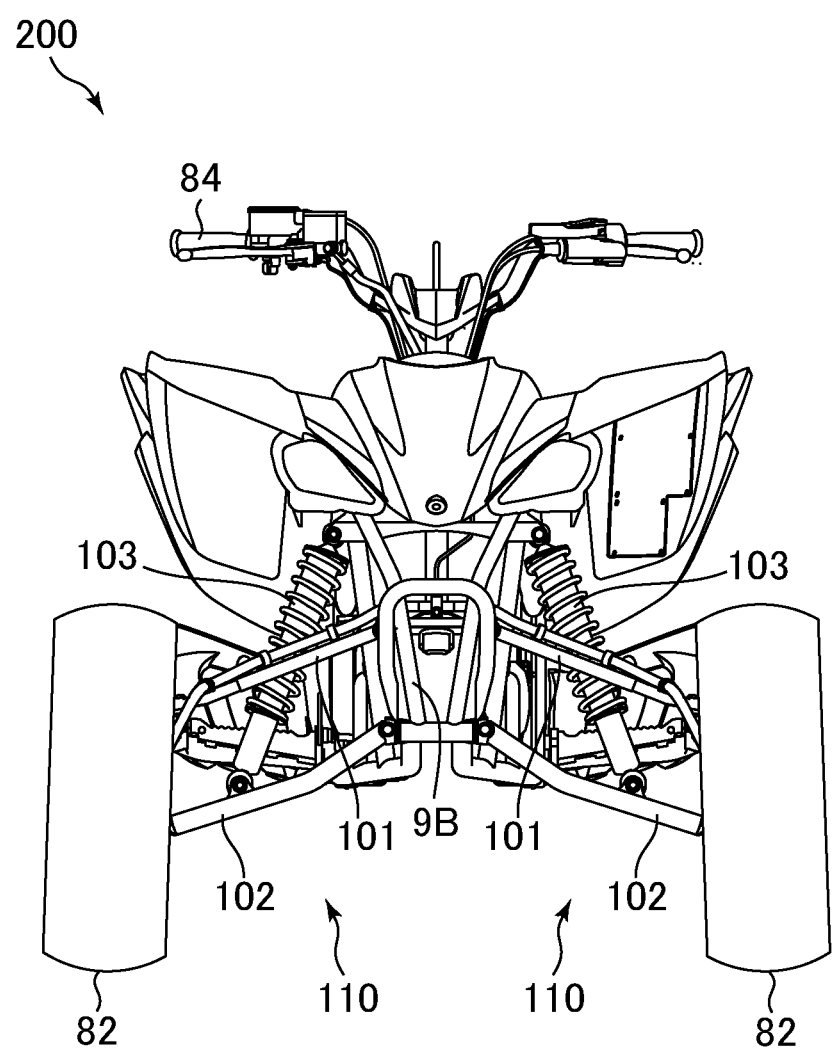
FIG. 29 is a front view of an ATV according to a preferred embodiment of the present invention.
Figure 30:
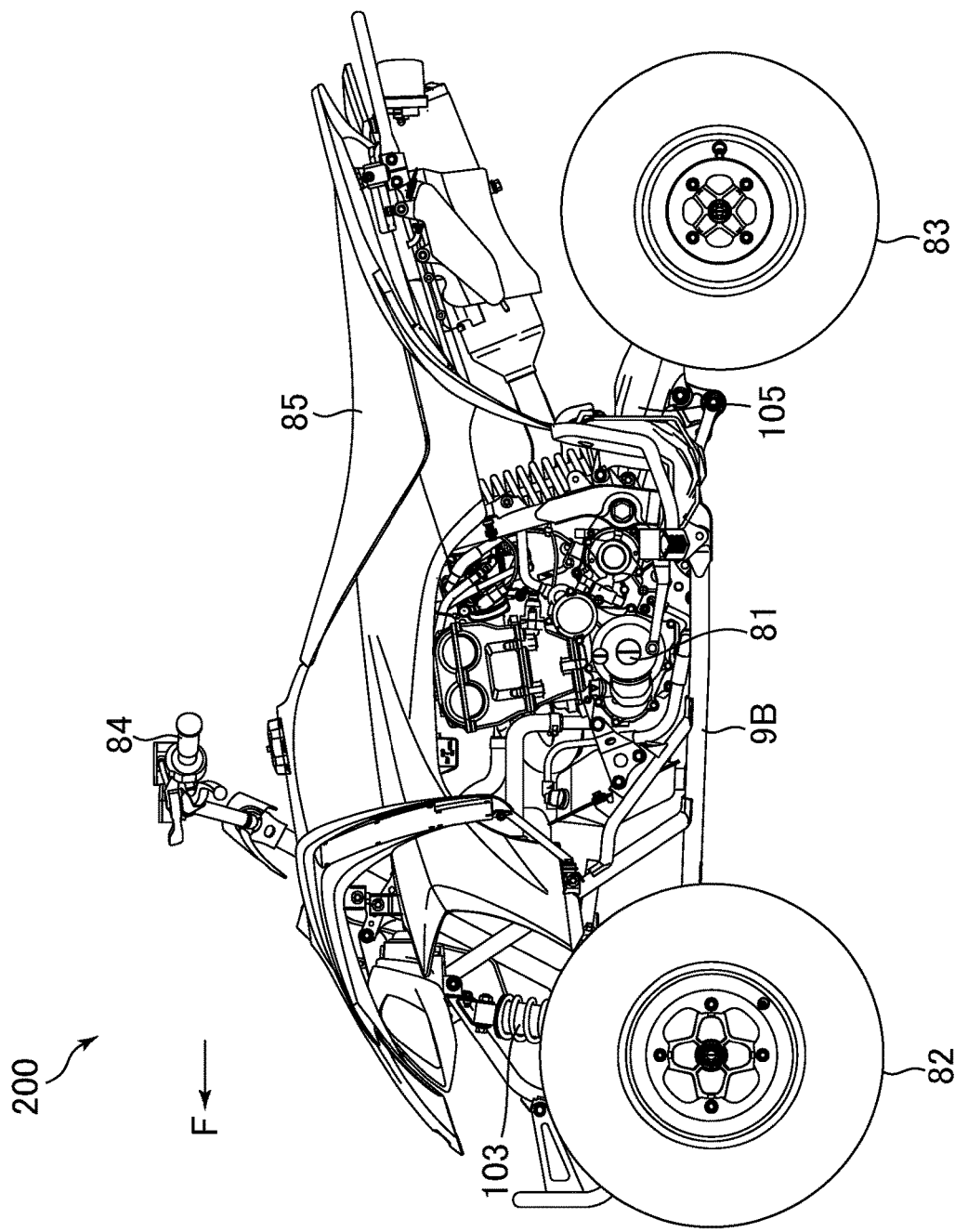
FIG. 30 is a left-side view of the ATV.

FIGS. 29 and 30 are a front view and a left-side view, respectively, of an ATV 200 according to a preferred embodiment of the present invention. The ATV 200 includes a vehicle body frame 9B. The engine 81 is supported on the vehicle body frame 9B so as to be inclined with the cylinder axis extending in the up-down direction. The pair of front wheels 82 are mounted in the lower front portion of the ATV 200 so as to be spaced apart from each other in the left-right direction, and the pair of rear wheels 83 are mounted in the lower rear portion of the ATV 200 so as to be spaced apart from each other in the left-right direction.

The pair of front wheels 82 are connected to the vehicle body frame 9B through the pair of suspensions 110 spaced apart from each other in the left-right direction. The pair of suspensions 110 each includes the upper arm 101, the lower arm 102, and the shock absorber 103. The pair of rear wheels 83 are supported so as to move in the up-down direction by the rear arms 105 that are rotatably supported by the vehicle body frame 9B.

Figure 31:
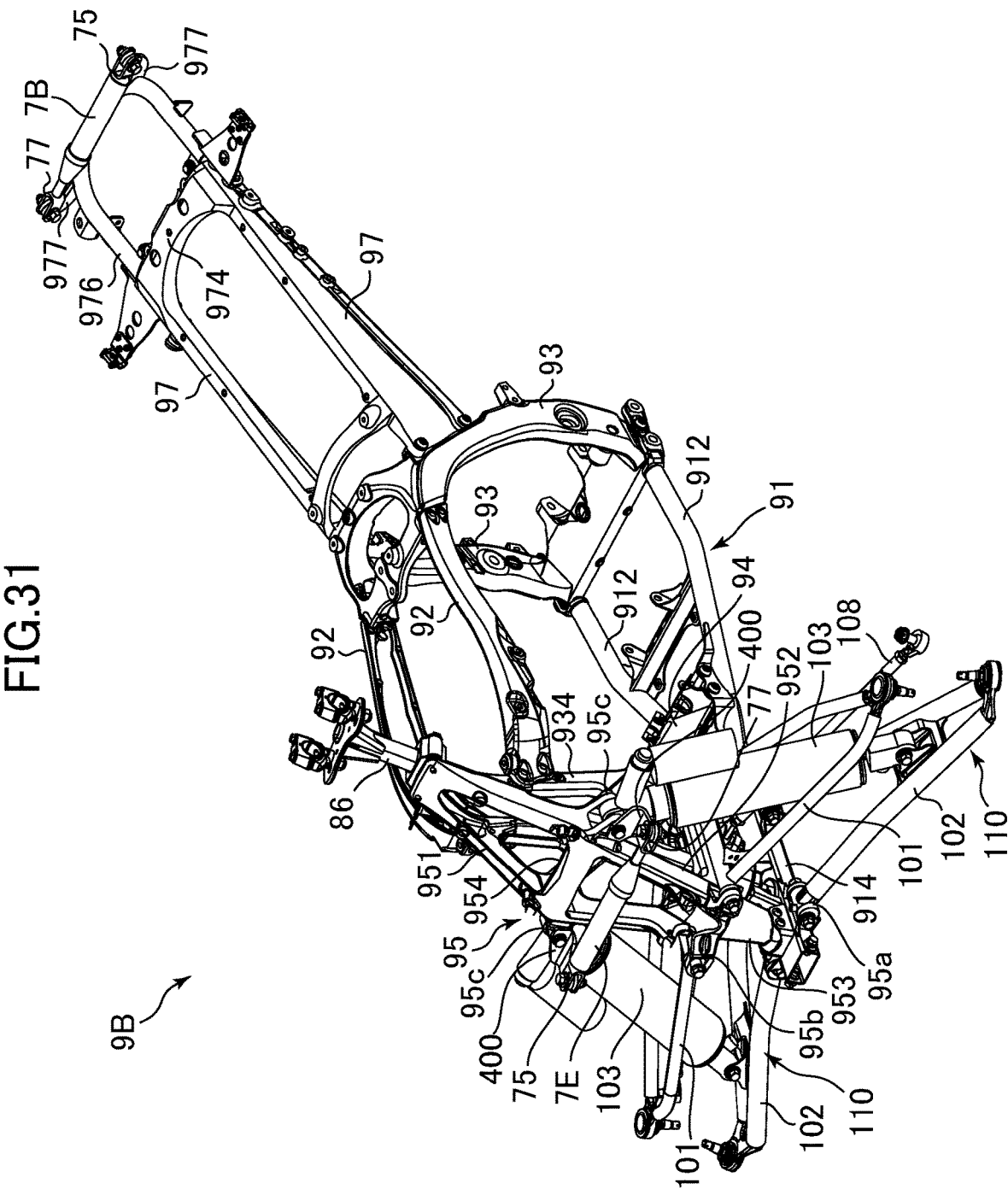
FIG. 31 is a perspective view of the vehicle body frame of the ATV.
Figure 32:
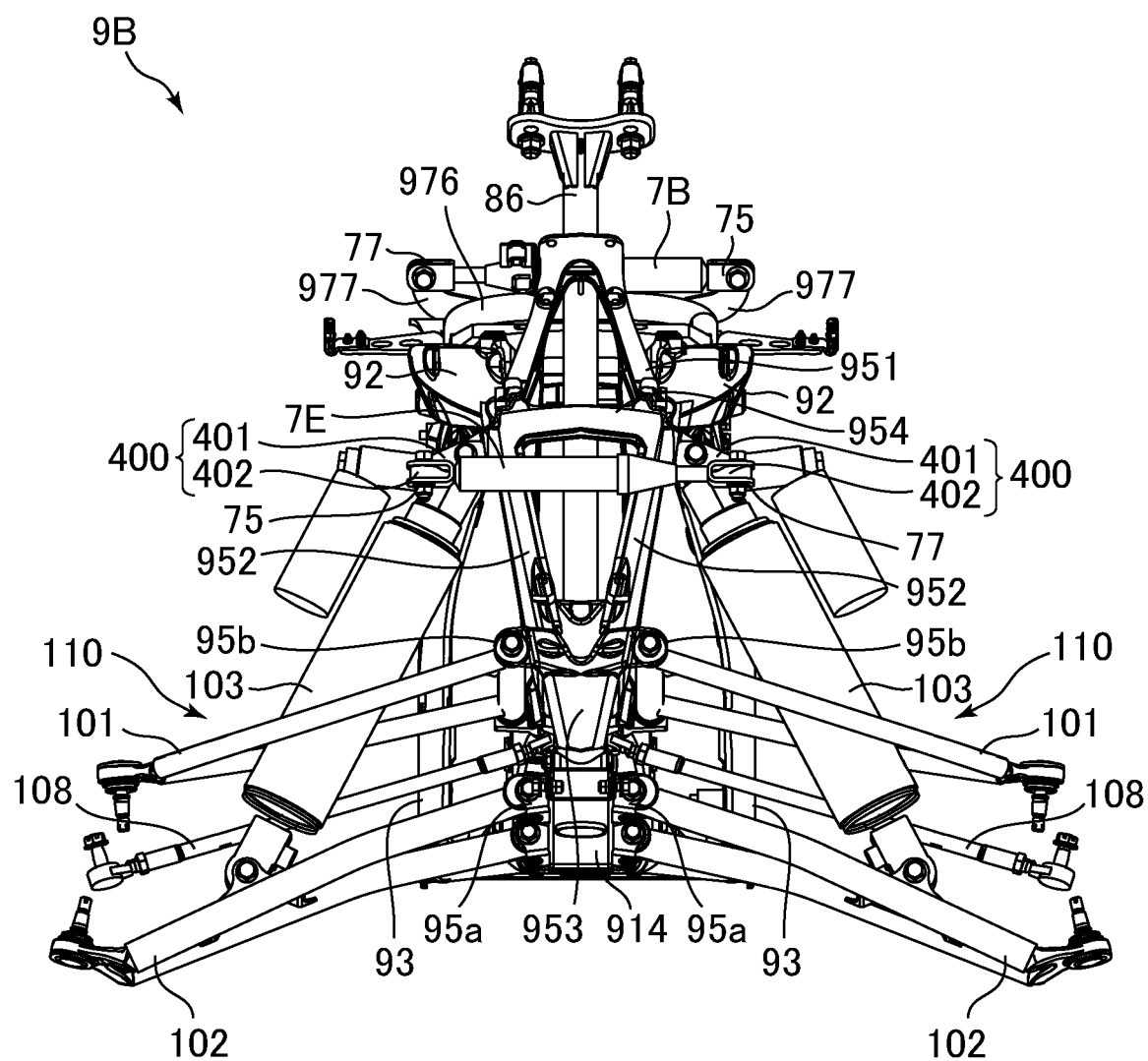
FIG. 32 is a front view of the front portion of the vehicle body frame.
Figure 33:
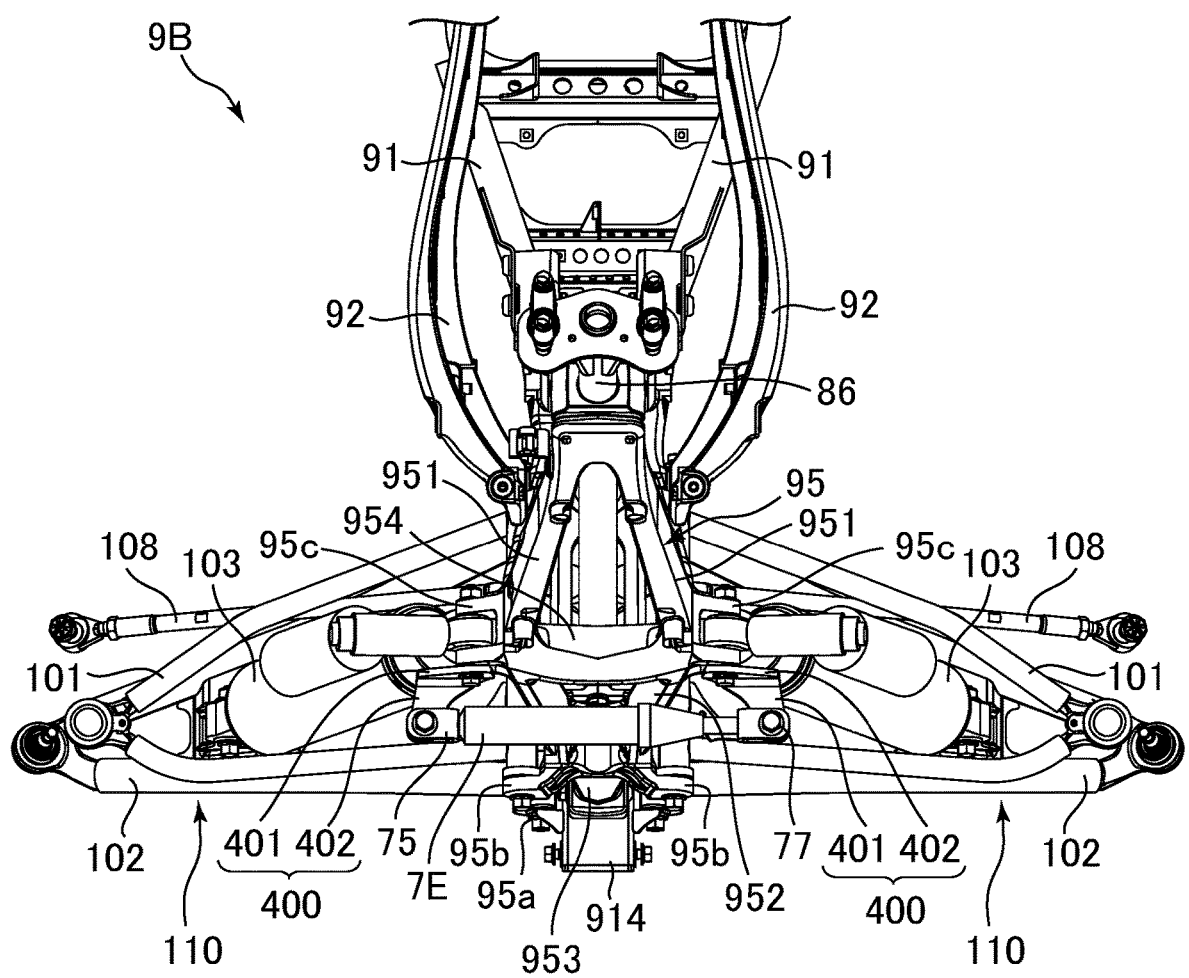
FIG. 33 is a plan view of the front portion of the vehicle body frame.
Figure 34:
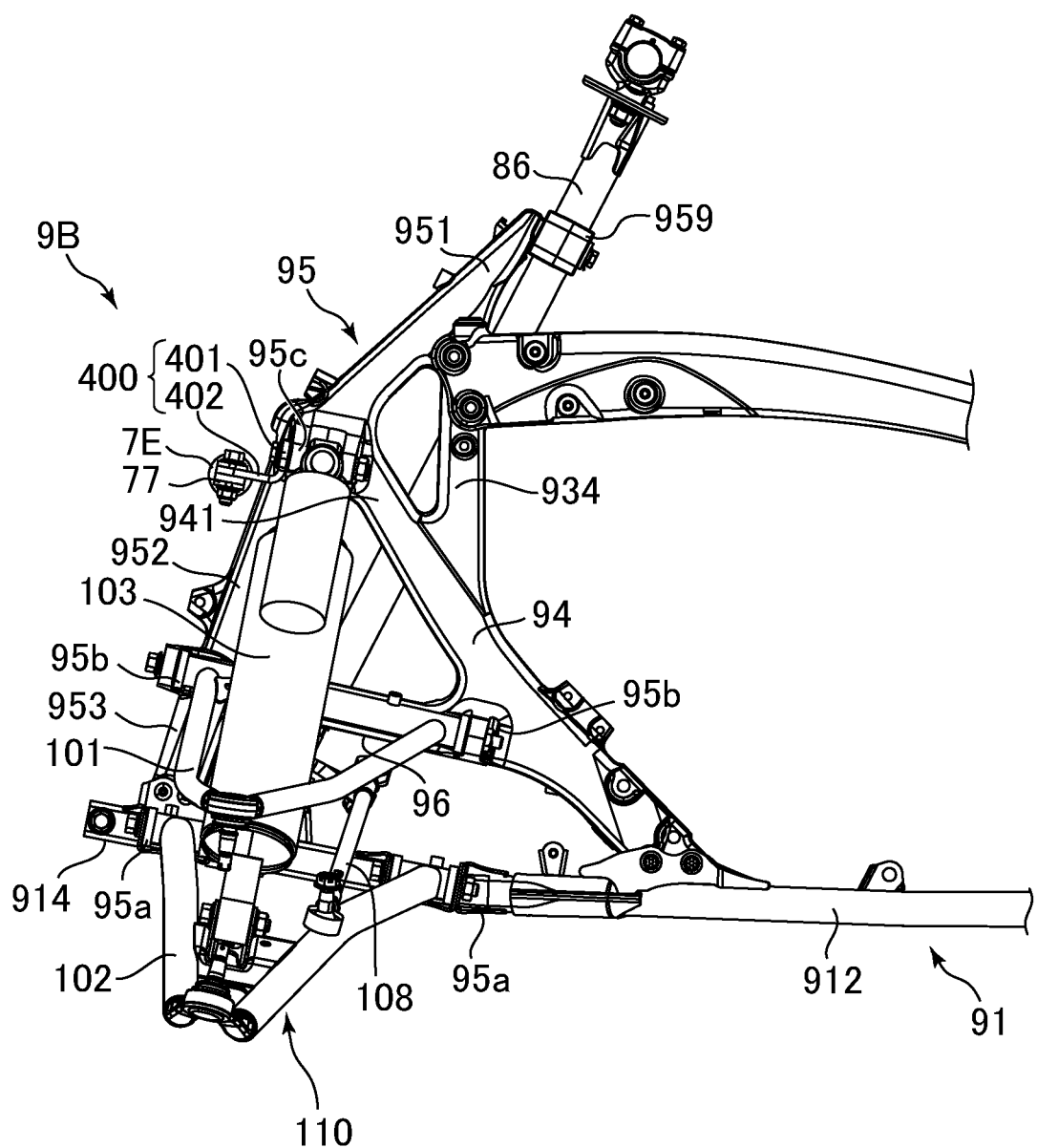
FIG. 34 is a left-side view of the front portion of the vehicle body frame.

FIG. 31 is a perspective view of the entire vehicle body frame 9B. FIGS. 32 to 34 are a front view, a plan view, and a left-side view, respectively, of the front portion of the vehicle body frame 9B. These figures illustrate the steering shaft 86, the suspensions 110, and the vehicle body vibration control dampers 7E, 7B mounted on the vehicle body frame 9B. Note that the vehicle body frame 9B in the present preferred embodiment is preferably the same as the vehicle body frame 9 of the ATV 8 in FIGS. 8 to 10.

In the present preferred embodiment, two vehicle body vibration control dampers 7E, 7B are mounted on the vehicle body frame 9B. Below, each of the vehicle body vibration control dampers 7E and 7B will be described.

The vehicle body vibration control damper 7E is connected, via the respective end portions thereof, to a pair of attachment portions (brackets) 400 mounted on the vehicle body frame 9B so as to be spaced apart from each other in the left-right direction, and is mounted so as to extend in the left-right direction. These attachment portions 400 are fastened by, for example, a screw to the pair of attachment portions 95c where the respective shock absorbers 103 are attached, together with the respective shock absorbers 103.

The attachment portion 400 is preferably made of an L-shaped metal piece. One end portion 401 of the attachment portion 400 is fastened by, for example, a screw to the attachment portion 95c together with the shock absorber 103, and the other end portion 402 is fastened by, for example, a screw to the attachment piece 75, 77 of the vehicle body vibration control damper 7.

Specifically, the rear portion 401 of the attachment portion 400 extends in the up-down direction and in the front-back direction. The rear portion 401 contacts the front surface of the attachment portion 95c and is attached together with the shock absorber 103. The attachment portion 400 extends forward from the attachment portion 95c to support the vehicle body vibration control damper 7E at a position more forward than the attachment portion 95c. The front portion 393 of the attachment portion 400 extends in the front-back direction and in the up-down direction. The front portion 393 is sandwiched by the attachment piece 75, 77 of the vehicle body vibration control damper 7E, and attached thereto.

The vehicle body vibration control damper 7B is preferably similar to the vehicle body vibration control damper 7B mounted on the vehicle body frame 9A in the above described preferred embodiments. That is, the vehicle body vibration control damper 7B is mounted on a member located at the rear end of the ATV 200, specifically, the grip bar 976 in the present preferred embodiment. Alternatively, the member located at the rear end of the ATV 200 may be the cross member 974 mounted on the rear end portions of the seat rail portions 97.

The respective end portions of the vehicle body vibration control dampers 7B are connected to the attachment portions (brackets) 977 mounted on the grip bar 976 so as to be spaced apart from each other in the left-right direction. Specifically, the attachment portion 977 is fixed by, for example, welding to each of the left and right portions of the U-shaped grip bar 976, wherein the left and right portions are spaced apart from each other in the left-right direction. The attachment 977 projects upward from the grip bar 376.

In the above described preferred embodiments, as shown in FIGS. 31 to 34, the pair of attachment portions 400 are attached to the pair of attachment portions 95c that attach the shock absorbers 103, together with the respective shock absorbers 103, and the vehicle body vibration control damper 7E is connected to these attachment portions 400. This enables quick and direct damping of the vibrations propagated from the shock absorbers 103 to the vehicle body frame 9B.

In particular, the pair of front wheels 82 of the ATV 100 often receive reaction forces from the ground surface that are mutually different in magnitude, and it is expected that vibrations twisting in the roll direction are likely caused in the vehicle body frame 9B. In the present preferred embodiment, the vehicle body vibration control damper 7E is mounted so as to extend in the left-right direction so that such vibrations are damped efficiently.

In the present preferred embodiment, as shown in FIG. 31, the vehicle body vibration control damper 7B is connected to the attachment portions 977 mounted on the grip bar 976, that is, a member located at the rear end of the ATV 200, so as to be spaced apart from each other in the left-right direction. Although a member located at the rear end of the ATV 200 may likely vibrate a large amount since the seat rail portion 97 is cantilevered, the vibrations in the seat rail portions 97 are damped by the vehicle-body vibration control damper 7B mounted on the member.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A straddle vehicle comprising:
a vehicle body frame;
a power unit supported by the vehicle body frame;
a seat mounted at a position higher than the power unit;
a handle bar mounted at a position more forward than the seat;
a pair of front wheels spaced apart from each other in a vehicle width direction;
a pair of suspensions spaced apart from each other in the vehicle width direction and suspending the pair of front wheels on the vehicle frame; and
a vehicle body vibration control damper including end portions connected to a first attachment portion and a second attachment portion, respectively, provided on the vehicle body frame and that are spaced apart from each other in a vehicle front-back direction, the vehicle body vibration control damper extending in the vehicle front-back direction with at least a portion thereof located between the pair of suspensions;
wherein
the pair of suspensions each includes a lower arm and an upper arm mounted in a front portion of the vehicle body frame; and
the vehicle body vibration control damper is mounted at a position vertically between where the lower arm is mounted and where the upper arm is mounted in the front portion of the vehicle body frame.

2. The straddle vehicle according to claim 1, wherein the body vibration control damper is mounted at a center of the straddle vehicle in the vehicle width direction.

3. The straddle vehicle according to claim 1, further comprising a second vehicle body vibration control damper mounted at a position more rearward than the vehicle body vibration control damper.

4. The straddle vehicle according to claim 3, wherein the second vehicle body vibration control damper extends in the vehicle width direction.

5. The straddle vehicle according to claim 3, wherein the second vehicle body vibration control damper is connected to a third attachment portion and a fourth attachment portion which are provided on a member on a rear end of the straddle vehicle so as to be spaced apart from each other in the vehicle width direction.

6. A straddle vehicle comprising:
a vehicle body frame;
a power unit supported by the vehicle body frame;
a seat mounted at a position higher than the power unit;
a handle bar mounted at a position more forward than the seat;
a pair of front wheels spaced apart from each other in a vehicle width direction;
a pair of suspensions spaced apart from each other in the vehicle width direction and suspending the pair of front wheels on the vehicle frame; and
a vehicle body vibration control damper including end portions connected to a first attachment portion and a second attachment portion, respectively, provided on the vehicle body frame and that are spaced apart from each other in a vehicle front-back direction, the vehicle body vibration control damper extending in the vehicle front-back direction with at least a portion thereof located between the pair of suspensions;
wherein
the pair of suspensions each includes a lower arm and an upper arm mounted in a front portion of the vehicle body frame;
the front portion of the vehicle body frame includes a left lower member where the lower arm on a left side is mounted, a right lower member where the lower arm on a right side is mounted, and a cross member extending between the left lower member and the right lower member; and
the vehicle body vibration control damper is connected to the first attachment portion and the second attachment portion which are both provided on the cross member.

7. A straddle vehicle comprising:
a vehicle body frame including an upper frame portion, a lower frame portion, a front frame portion, and a pillar portion that extends upward and forward from the lower frame portion to connect to the front frame portion;

a power unit supported by the vehicle body frame;

a seat mounted at a position higher than the power unit;

a handle bar mounted at a position more forward than the seat;

a pair of front wheels spaced apart from each other in a vehicle width direction;

a pair of suspensions spaced apart from each other in the vehicle width direction and suspending the pair of front wheels on the vehicle frame;

a vehicle body vibration control damper including end portions connected to a first attachment portion and a second attachment portion, respectively, provided on the vehicle body frame and that are spaced apart from each other in a vehicle front-back direction, the vehicle body vibration control damper extending in the vehicle front-back direction with at least a portion thereof located between the pair of suspensions; and a steering shaft extending downward and forward from the handle bar; wherein the vehicle body vibration control damper is connected to the first attachment portion that is located more forward than a lower end portion of the steering shaft and the second attachment portion that is located more rearward than the lower end portion of the steering shaft; and the vehicle body vibration control damper is located lower than the pillar portion.

* * * * *